(12) United States Patent
Derelöv

(10) Patent No.: US 11,480,204 B2
(45) Date of Patent: Oct. 25, 2022

(54) AUTOMATED ASSEMBLY

(71) Applicant: Välinge Innovation AB, Viken (SE)

(72) Inventor: Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 178 days.

(21) Appl. No.: 16/839,657

(22) Filed: Apr. 3, 2020

(65) Prior Publication Data

US 2020/0318667 A1 Oct. 8, 2020

(30) Foreign Application Priority Data

Apr. 5, 2019 (EP) .................................... 19167502

(51) Int. Cl.
*F16B 5/00* (2006.01)
*F16B 12/12* (2006.01)
(Continued)

(52) U.S. Cl.
CPC .......... *F16B 5/0084* (2013.01); *F16B 5/0012* (2013.01); *F16B 12/125* (2013.01);
(Continued)

(58) Field of Classification Search
CPC . A47B 47/042; A47B 47/0066; A47B 47/047; A47B 47/0075; F16B 12/125;
(Continued)

(56) References Cited

U.S. PATENT DOCUMENTS

| 1,194,636 A | 8/1916 | Joy |
| 1,687,522 A | 10/1928 | Staude |

(Continued)

FOREIGN PATENT DOCUMENTS

| BE | 1 019 989 A3 | 3/2013 |
| BE | 1 020 211 A5 | 6/2013 |

(Continued)

OTHER PUBLICATIONS

International Search Report and Written Opinion issued in PCT/SE2017/050718, dated Sep. 15, 2017, 11 pages, ISA/SE, Patent-och registreringsverket, Stockholm, SE.

(Continued)

*Primary Examiner* — Jonathan P Masinick
(74) *Attorney, Agent, or Firm* — Buchanan Ingersoll & Rooney P.C.

(57) ABSTRACT

A method of assembling a set of panels, to obtain an assembled product, including connecting a first edge of a first panel, with a first main plane, to a first edge of a second panel, with a second main plane, including arranging a third panel with a third main plane perpendicular to the first main plane, arranging a first edge of the third panel at a second edge of the second panel and arranging the third main plane with a second angle in relation to the second main plane; connecting the first edge of the third panel to the second edge of the second panel, by displacing the third panel and/or the second panel; and connecting a second edge of the third panel to a second edge of the first panel and connecting the first edge of the third panel to the second edge of the second panel.

17 Claims, 15 Drawing Sheets

(51) Int. Cl.
*A47B 47/00* (2006.01)
*A47B 47/04* (2006.01)

(52) U.S. Cl.
CPC ......... *A47B 47/0066* (2013.01); *A47B 47/042* (2013.01); *A47B 2230/0077* (2013.01); *A47B 2230/0081* (2013.01)

(58) Field of Classification Search
CPC .. F16B 12/46; F16B 2012/466; F16B 5/0004; F16B 5/0008; F16B 5/0012; F16B 5/0016; F16B 5/0032; F16B 5/0056; F16B 5/008
See application file for complete search history.

(56) References Cited

U.S. PATENT DOCUMENTS

| | | |
|---|---|---|
| 1,902,716 A | 3/1933 | Newton |
| 3,114,477 A | 12/1963 | Dixon |
| 3,143,335 A | 8/1964 | Lassahn |
| 3,147,522 A | 9/1964 | Schumm |
| 3,381,730 A | 5/1968 | Omholt |
| 3,572,224 A | 3/1971 | Perry |
| 3,579,941 A | 5/1971 | Tibbals |
| 3,584,761 A | 6/1971 | Flanigan et al. |
| 3,720,027 A | 3/1973 | Christensen |
| 3,760,485 A | 9/1973 | Smith |
| 3,760,547 A | 9/1973 | Brenneman |
| 3,778,954 A | 12/1973 | Meserole |
| 3,919,820 A | 11/1975 | Green |
| 3,930,808 A | 1/1976 | Miller et al. |
| 3,961,408 A | 6/1976 | Goodsmith |
| 4,098,173 A | 7/1978 | Schauman |
| 4,332,203 A | 6/1982 | Flowers |
| 4,648,165 A | 3/1987 | Whitehorne |
| 4,899,438 A | 2/1990 | Muller et al. |
| 5,105,980 A | 4/1992 | Hofmann |
| 5,174,022 A | 12/1992 | Phillips et al. |
| 5,388,721 A | 2/1995 | Mauer |
| 5,582,611 A | 12/1996 | Tsuruta et al. |
| 5,636,426 A | 6/1997 | Luckhardt et al. |
| 5,810,239 A | 9/1998 | Stich |
| 5,996,876 A | 12/1999 | Dickhoff et al. |
| 6,098,442 A | 8/2000 | Walldorf et al. |
| 6,273,315 B1 | 8/2001 | McGuinness et al. |
| 6,314,701 B1 | 11/2001 | Meyerson |
| 6,363,677 B1 | 4/2002 | Chen et al. |
| 6,385,936 B1 | 5/2002 | Schneider |
| 6,413,007 B1 | 7/2002 | Lambright |
| 6,418,683 B1 | 7/2002 | Martensson et al. |
| 6,446,413 B1 | 9/2002 | Gruber |
| 6,490,836 B1 | 12/2002 | Moriau et al. |
| 6,505,452 B1 | 1/2003 | Hannig |
| 6,592,015 B1 | 7/2003 | Gostylla et al. |
| 6,631,827 B2 | 10/2003 | Goodsmith |
| 6,647,690 B1 | 11/2003 | Martensson |
| 6,651,400 B1 | 11/2003 | Murphy |
| 6,655,573 B1 | 12/2003 | Chang |
| 6,763,643 B1 | 7/2004 | Martensson |
| 6,766,622 B1 | 7/2004 | Thiers |
| 6,769,835 B2 | 8/2004 | Stridsman |
| 6,804,926 B1 | 10/2004 | Eisermann |
| 6,807,719 B2 | 10/2004 | Herr et al. |
| 6,843,402 B2 | 1/2005 | Sims et al. |
| 6,854,235 B2 | 2/2005 | Martensson |
| 6,880,307 B2 | 4/2005 | Schwitte et al. |
| 7,040,068 B2 | 5/2006 | Moriau et al. |
| 7,051,486 B2 | 5/2006 | Pervan |
| 7,188,456 B2 | 3/2007 | Knauseder |
| 7,255,256 B2 | 8/2007 | McGee et al. |
| 7,344,057 B2 | 3/2008 | Dion et al. |
| 7,451,578 B2 | 11/2008 | Hannig |
| 7,454,875 B2 | 11/2008 | Pervan et al. |
| 7,568,322 B2 | 8/2009 | Pervan |
| 7,584,583 B2 | 9/2009 | Bergelin et al. |
| 7,614,197 B2 | 11/2009 | Nelson |
| 7,617,651 B2 | 11/2009 | Grafenauer |
| 7,621,092 B2 | 11/2009 | Groeke et al. |
| 7,634,884 B2 | 12/2009 | Pervan |
| 7,637,068 B2 | 12/2009 | Pervan |
| 7,677,005 B2 | 3/2010 | Pervan |
| 7,721,503 B2 | 5/2010 | Pervan et al. |
| 7,757,452 B2 | 7/2010 | Pervan |
| 7,802,411 B2 | 9/2010 | Pervan |
| 7,841,144 B2 | 11/2010 | Pervan et al. |
| 7,841,145 B2 | 11/2010 | Pervan et al. |
| 7,841,150 B2 | 11/2010 | Pervan |
| 7,856,789 B2 | 12/2010 | Eisermann |
| 7,861,482 B2 | 1/2011 | Pervan et al. |
| 7,866,110 B2 | 1/2011 | Pervan |
| 7,896,571 B1 | 3/2011 | Hannig et al. |
| 7,908,815 B2 | 3/2011 | Pervan et al. |
| 7,908,816 B2 | 3/2011 | Grafenauer |
| 7,930,862 B2 | 4/2011 | Bergelin et al. |
| 7,980,041 B2 | 7/2011 | Pervan |
| 8,033,074 B2 | 10/2011 | Pervan |
| 8,042,311 B2 | 10/2011 | Pervan |
| 8,061,104 B2 | 11/2011 | Pervan |
| 8,061,248 B2 | 11/2011 | Svensson |
| 8,079,196 B2 | 12/2011 | Pervan |
| 8,091,238 B2 | 1/2012 | Hannig |
| 8,112,967 B2 | 2/2012 | Pervan et al. |
| 8,171,692 B2 | 5/2012 | Pervan |
| 8,181,416 B2 | 5/2012 | Pervan et al. |
| 8,234,830 B2 | 8/2012 | Pervan et al. |
| 8,256,104 B2 | 9/2012 | Fulbright |
| 8,302,367 B2 | 11/2012 | Schulte |
| 8,341,914 B2 | 1/2013 | Pervan et al. |
| 8,341,915 B2 | 1/2013 | Pervan et al. |
| 8,353,140 B2 | 1/2013 | Pervan et al. |
| 8,359,805 B2 | 1/2013 | Pervan et al. |
| 8,381,476 B2 | 2/2013 | Hannig |
| 8,381,477 B2 | 2/2013 | Pervan et al. |
| 8,387,327 B2 | 3/2013 | Pervan |
| 8,448,402 B2 | 5/2013 | Pervan et al. |
| 8,499,521 B2 | 8/2013 | Pervan et al. |
| 8,505,257 B2 | 8/2013 | Boo et al. |
| 8,528,289 B2 | 9/2013 | Pervan et al. |
| 8,544,230 B2 | 10/2013 | Pervan |
| 8,544,234 B2 | 10/2013 | Pervan et al. |
| 8,572,922 B2 | 11/2013 | Pervan |
| 8,596,013 B2 | 12/2013 | Boo |
| 8,627,862 B2 | 1/2014 | Pervan et al. |
| 8,640,424 B2 | 2/2014 | Pervan et al. |
| 8,650,738 B2 | 2/2014 | Schulte |
| 8,650,826 B2 | 2/2014 | Pervan et al. |
| 8,677,714 B2 | 3/2014 | Pervan |
| 8,689,512 B2 | 4/2014 | Pervan |
| 8,707,650 B2 | 4/2014 | Pervan |
| 8,713,886 B2 | 5/2014 | Boo et al. |
| 8,733,065 B2 | 5/2014 | Pervan |
| 8,733,410 B2 | 5/2014 | Pervan |
| 8,763,340 B2 | 7/2014 | Pervan et al. |
| 8,763,341 B2 | 7/2014 | Pervan |
| 8,769,905 B2 | 7/2014 | Pervan |
| 8,776,473 B2 | 7/2014 | Pervan et al. |
| 8,844,236 B2 | 9/2014 | Pervan et al. |
| 8,857,126 B2 | 10/2014 | Pervan et al. |
| 8,869,485 B2 | 10/2014 | Pervan |
| 8,898,988 B2 | 12/2014 | Pervan |
| 8,925,274 B2 | 1/2015 | Pervan et al. |
| 8,959,866 B2 | 2/2015 | Pervan |
| 8,973,331 B2 | 3/2015 | Boo |
| 9,027,306 B2 | 5/2015 | Pervan |
| 9,051,738 B2 | 6/2015 | Pervan et al. |
| 9,068,360 B2 | 6/2015 | Pervan |
| 9,091,077 B2 | 7/2015 | Boo |
| 9,120,141 B2 | 9/2015 | Clew et al. |
| 9,175,703 B2 * | 11/2015 | Maertens ............. A47B 96/206 |
| 9,194,134 B2 | 11/2015 | Nygren et al. |
| 9,212,492 B2 | 12/2015 | Pervan et al. |
| 9,216,541 B2 | 12/2015 | Boo et al. |
| 9,238,917 B2 | 1/2016 | Pervan et al. |
| 9,284,737 B2 | 3/2016 | Pervan et al. |

(56) References Cited

U.S. PATENT DOCUMENTS

| | | | |
|---|---|---|---|
| 9,309,679 B2 | 4/2016 | Pervan et al. |
| 9,316,002 B2 | 4/2016 | Boo |
| 9,340,974 B2 | 5/2016 | Pervan et al. |
| 9,347,469 B2 | 5/2016 | Pervan |
| 9,359,774 B2 | 6/2016 | Pervan |
| 9,366,036 B2 | 6/2016 | Pervan |
| 9,376,821 B2 | 6/2016 | Pervan et al. |
| 9,382,716 B2 | 7/2016 | Pervan et al. |
| 9,388,584 B2 | 7/2016 | Pervan et al. |
| 9,428,919 B2 | 8/2016 | Pervan et al. |
| 9,453,347 B2 | 9/2016 | Pervan et al. |
| 9,458,634 B2 | 10/2016 | Derelov |
| 9,482,012 B2 | 11/2016 | Nygren et al. |
| 9,540,826 B2 | 1/2017 | Pervan et al. |
| 9,555,529 B2 | 1/2017 | Ronconi |
| 9,663,940 B2 | 5/2017 | Boo |
| 9,725,912 B2 | 8/2017 | Pervan |
| 9,771,723 B2 | 9/2017 | Pervan |
| 9,777,487 B2 | 10/2017 | Pervan et al. |
| 9,803,374 B2 | 10/2017 | Pervan |
| 9,803,375 B2 | 10/2017 | Pervan |
| 9,856,656 B2 | 1/2018 | Pervan |
| 9,874,027 B2 | 1/2018 | Pervan |
| 9,945,130 B2 | 4/2018 | Nygren et al. |
| 9,951,526 B2 | 4/2018 | Boo et al. |
| 10,006,210 B2 | 6/2018 | Pervan et al. |
| 10,017,948 B2 | 7/2018 | Boo |
| 10,076,185 B1 * | 9/2018 | Bennett | F16B 12/26 |
| 10,113,319 B2 | 10/2018 | Pervan |
| 10,125,488 B2 | 11/2018 | Boo |
| 10,138,636 B2 | 11/2018 | Pervan |
| 10,161,139 B2 | 12/2018 | Pervan |
| 10,180,005 B2 | 1/2019 | Pervan et al. |
| 10,214,915 B2 | 2/2019 | Pervan et al. |
| 10,214,917 B2 | 2/2019 | Pervan et al. |
| 10,240,348 B2 | 3/2019 | Pervan et al. |
| 10,240,349 B2 | 3/2019 | Pervan et al. |
| 10,246,883 B2 | 4/2019 | Derelöv |
| 10,307,815 B2 | 6/2019 | Badent et al. |
| 10,352,049 B2 | 7/2019 | Boo |
| 10,358,830 B2 | 7/2019 | Pervan |
| 10,378,217 B2 | 8/2019 | Pervan |
| 10,458,125 B2 | 10/2019 | Pervan |
| 10,519,676 B2 | 12/2019 | Pervan |
| 10,526,792 B2 | 1/2020 | Pervan et al. |
| 10,538,922 B2 | 1/2020 | Pervan |
| 10,570,625 B2 | 2/2020 | Pervan |
| 10,640,989 B2 | 5/2020 | Pervan |
| 10,655,339 B2 | 5/2020 | Pervan |
| 10,669,723 B2 | 6/2020 | Pervan et al. |
| 10,724,251 B2 | 7/2020 | Kell |
| 10,731,358 B2 | 8/2020 | Pervan |
| 10,794,065 B2 | 10/2020 | Boo et al. |
| 10,828,798 B2 | 11/2020 | Fransson |
| 10,933,592 B2 | 3/2021 | Blomgren et al. |
| 10,934,721 B2 | 3/2021 | Pervan et al. |
| 10,953,566 B2 | 3/2021 | Fransson et al. |
| 10,968,639 B2 | 4/2021 | Pervan et al. |
| 10,975,577 B2 | 4/2021 | Pervan et al. |
| 10,995,501 B2 | 5/2021 | Pervan |
| 11,045,933 B2 | 6/2021 | Fransson et al. |
| 11,053,691 B2 | 7/2021 | Pervan |
| 11,053,692 B2 | 7/2021 | Pervan |
| 11,060,302 B2 | 7/2021 | Ylikangas et al. |
| 11,066,835 B2 | 7/2021 | Boo |
| 11,078,673 B2 | 8/2021 | Pervan et al. |
| 11,091,920 B2 | 8/2021 | Kell |
| 11,131,099 B2 | 9/2021 | Pervan |
| 11,174,646 B2 | 11/2021 | Pervan |
| 11,193,283 B2 | 12/2021 | Pervan et al. |
| 2002/0031646 A1 | 3/2002 | Chen et al. |
| 2002/0170259 A1 | 11/2002 | Ferris |
| 2002/0178674 A1 | 12/2002 | Pervan |
| 2003/0009971 A1 | 1/2003 | Palmberg |
| 2003/0024199 A1 | 2/2003 | Pervan et al. |
| 2003/0037504 A1 | 2/2003 | Schwitte et al. |
| 2003/0180091 A1 | 9/2003 | Stridsman |
| 2003/0188504 A1 | 10/2003 | Ralf |
| 2003/0196405 A1 | 10/2003 | Pervan |
| 2004/0016196 A1 | 1/2004 | Pervan |
| 2004/0031227 A1 | 2/2004 | Knauseder |
| 2004/0060255 A1 | 4/2004 | Knauseder |
| 2004/0068954 A1 | 4/2004 | Martensson |
| 2004/0123548 A1 | 7/2004 | Gimpel et al. |
| 2004/0128934 A1 | 7/2004 | Hecht |
| 2004/0200175 A1 | 10/2004 | Weber |
| 2004/0211143 A1 | 10/2004 | Hannig |
| 2004/0244325 A1 | 12/2004 | Nelson |
| 2004/0261348 A1 | 12/2004 | Vulin |
| 2005/0081373 A1 | 4/2005 | Seidler |
| 2005/0160694 A1 | 7/2005 | Pervan |
| 2005/0210081 A1 | 9/2005 | Pervan |
| 2005/0205161 A1 | 9/2005 | Lewark |
| 2006/0070333 A1 | 4/2006 | Pervan |
| 2006/0101769 A1 | 5/2006 | Pervan |
| 2006/0162814 A1 | 7/2006 | Symossek et al. |
| 2006/0236642 A1 | 10/2006 | Pervan |
| 2006/0260254 A1 | 11/2006 | Pervan et al. |
| 2007/0006543 A1 | 1/2007 | Engström |
| 2007/0011981 A1 | 1/2007 | Eiserman |
| 2007/0028547 A1 | 2/2007 | Grafenauer |
| 2007/0151189 A1 | 7/2007 | Yang et al. |
| 2007/0175156 A1 | 8/2007 | Pervan et al. |
| 2007/0193178 A1 | 8/2007 | Groeke et al. |
| 2008/0000186 A1 | 1/2008 | Pervan et al. |
| 2008/0000187 A1 | 1/2008 | Pervan et al. |
| 2008/0010931 A1 | 1/2008 | Pervan et al. |
| 2008/0010937 A1 | 1/2008 | Pervan et al. |
| 2008/0028707 A1 | 2/2008 | Pervan |
| 2008/0034708 A1 | 2/2008 | Pervan |
| 2008/0041008 A1 | 2/2008 | Pervan |
| 2008/0066415 A1 | 3/2008 | Pervan |
| 2008/0104921 A1 | 5/2008 | Pervan et al. |
| 2008/0110125 A1 | 5/2008 | Pervan |
| 2008/0134607 A1 | 6/2008 | Pervan |
| 2008/0134613 A1 | 6/2008 | Pervan |
| 2008/0134614 A1 | 6/2008 | Pervan |
| 2008/0155930 A1 | 7/2008 | Pervan et al. |
| 2008/0216434 A1 | 9/2008 | Pervan |
| 2008/0216920 A1 | 9/2008 | Pervan |
| 2008/0295432 A1 | 12/2008 | Pervan et al. |
| 2009/0133353 A1 | 5/2009 | Pervan et al. |
| 2009/0193748 A1 | 8/2009 | Boo et al. |
| 2010/0043333 A1 | 2/2010 | Hannig et al. |
| 2010/0218360 A1 | 9/2010 | Mangone, Jr. |
| 2010/0293879 A1 | 11/2010 | Pervan et al. |
| 2010/0300031 A1 | 12/2010 | Pervan et al. |
| 2010/0313714 A1 | 12/2010 | Smith |
| 2010/0319290 A1 | 12/2010 | Pervan |
| 2010/0319291 A1 | 12/2010 | Pervan et al. |
| 2011/0030303 A1 | 2/2011 | Pervan et al. |
| 2011/0041996 A1 | 2/2011 | Pervan |
| 2011/0088344 A1 | 4/2011 | Pervan et al. |
| 2011/0088345 A1 | 4/2011 | Pervan |
| 2011/0088346 A1 | 4/2011 | Hannig |
| 2011/0094083 A1 | 4/2011 | Schulte |
| 2011/0154763 A1 | 6/2011 | Bergelin et al. |
| 2011/0167750 A1 | 7/2011 | Pervan |
| 2011/0167751 A1 | 7/2011 | Engström |
| 2011/0225922 A1 | 9/2011 | Pervan et al. |
| 2011/0252733 A1 | 10/2011 | Pervan |
| 2011/0283650 A1 | 11/2011 | Pervan et al. |
| 2012/0017533 A1 | 1/2012 | Pervan et al. |
| 2012/0031029 A1 | 2/2012 | Pervan et al. |
| 2012/0036804 A1 | 2/2012 | Pervan |
| 2012/0073235 A1 | 3/2012 | Hannig |
| 2012/0151865 A1 | 6/2012 | Pervan et al. |
| 2012/0174515 A1 | 7/2012 | Pervan |
| 2012/0174520 A1 | 7/2012 | Pervan |
| 2012/0279161 A1 | 11/2012 | Håkansson et al. |
| 2013/0008117 A1 | 1/2013 | Pervan |
| 2013/0014463 A1 | 1/2013 | Pervan |
| 2013/0019555 A1 | 1/2013 | Pervan |
| 2013/0042562 A1 | 2/2013 | Pervan |

(56) References Cited

U.S. PATENT DOCUMENTS

| | | |
|---|---|---|
| 2013/0042563 A1 | 2/2013 | Pervan |
| 2013/0042564 A1 | 2/2013 | Pervan et al. |
| 2013/0042565 A1 | 2/2013 | Pervan |
| 2013/0047536 A1 | 2/2013 | Pervan |
| 2013/0071172 A1* | 3/2013 | Maertens ............... F16B 12/125 403/27 |
| 2013/0081349 A1 | 4/2013 | Pervan et al. |
| 2013/0111845 A1 | 5/2013 | Pervan |
| 2013/0145708 A1 | 6/2013 | Pervan |
| 2013/0160391 A1 | 6/2013 | Pervan et al. |
| 2013/0170904 A1* | 7/2013 | Cappelle ................. F16B 12/26 403/381 |
| 2013/0232905 A2 | 9/2013 | Pervan |
| 2013/0239508 A1 | 9/2013 | Pervan et al. |
| 2013/0263454 A1 | 10/2013 | Boo et al. |
| 2013/0263547 A1 | 10/2013 | Boo |
| 2013/0318906 A1 | 12/2013 | Pervan et al. |
| 2014/0007539 A1 | 1/2014 | Pervan et al. |
| 2014/0020324 A1 | 1/2014 | Pervan |
| 2014/0033634 A1 | 2/2014 | Pervan |
| 2014/0042203 A1 | 2/2014 | Abe |
| 2014/0053497 A1 | 2/2014 | Pervan et al. |
| 2014/0059966 A1 | 3/2014 | Boo |
| 2014/0069043 A1 | 3/2014 | Pervan |
| 2014/0090335 A1 | 4/2014 | Pervan et al. |
| 2014/0109501 A1 | 4/2014 | Pervan |
| 2014/0109506 A1 | 4/2014 | Pervan et al. |
| 2014/0123586 A1 | 5/2014 | Pervan et al. |
| 2014/0138422 A1 | 5/2014 | Ronconi |
| 2014/0150369 A1 | 6/2014 | Hannig |
| 2014/0190112 A1 | 7/2014 | Pervan |
| 2014/0208677 A1 | 7/2014 | Pervan et al. |
| 2014/0223852 A1 | 8/2014 | Pervan |
| 2014/0237931 A1 | 8/2014 | Pervan |
| 2014/0250813 A1 | 9/2014 | Nygren et al. |
| 2014/0260060 A1 | 9/2014 | Pervan et al. |
| 2014/0305065 A1 | 10/2014 | Pervan |
| 2014/0338177 A1 | 11/2014 | Vermeulen et al. |
| 2014/0366476 A1 | 12/2014 | Pervan |
| 2014/0373478 A2 | 12/2014 | Pervan et al. |
| 2014/0373480 A1 | 12/2014 | Pervan et al. |
| 2015/0000221 A1 | 1/2015 | Boo |
| 2015/0013260 A1 | 1/2015 | Pervan |
| 2015/0059281 A1 | 3/2015 | Pervan |
| 2015/0078819 A1 | 3/2015 | Derelöv et al. |
| 2015/0089896 A2 | 4/2015 | Pervan et al. |
| 2015/0121796 A1 | 5/2015 | Pervan |
| 2015/0152644 A1 | 6/2015 | Boo |
| 2015/0167318 A1 | 6/2015 | Pervan |
| 2015/0211239 A1 | 7/2015 | Pervan |
| 2015/0233125 A1 | 8/2015 | Pervan et al. |
| 2015/0267419 A1 | 9/2015 | Pervan |
| 2015/0300029 A1 | 10/2015 | Pervan |
| 2015/0321325 A1 | 11/2015 | Vandenberg |
| 2015/0330088 A1 | 11/2015 | Derelov |
| 2015/0336224 A1 | 11/2015 | Liu et al. |
| 2015/0337537 A1 | 11/2015 | Boo |
| 2016/0000220 A1* | 1/2016 | Devos ..................... F16B 12/46 403/363 |
| 2016/0032596 A1 | 2/2016 | Nygren et al. |
| 2016/0060879 A1 | 3/2016 | Pervan |
| 2016/0069088 A1 | 3/2016 | Boo et al. |
| 2016/0076260 A1 | 3/2016 | Pervan et al. |
| 2016/0090744 A1 | 3/2016 | Pervan et al. |
| 2016/0129573 A1 | 5/2016 | Anstett et al. |
| 2016/0153200 A1 | 6/2016 | Pervan |
| 2016/0168866 A1 | 6/2016 | Pervan et al. |
| 2016/0186426 A1 | 6/2016 | Boo |
| 2016/0194884 A1 | 7/2016 | Pervan et al. |
| 2016/0201336 A1 | 7/2016 | Pervan |
| 2016/0222673 A1* | 8/2016 | Brink ..................... E04F 11/09 |
| 2016/0251859 A1 | 9/2016 | Pervan et al. |
| 2016/0251860 A1 | 9/2016 | Pervan |
| 2016/0281368 A1 | 9/2016 | Pervan et al. |
| 2016/0281370 A1 | 9/2016 | Pervan et al. |
| 2016/0326751 A1 | 11/2016 | Pervan |
| 2016/0340913 A1 | 11/2016 | Derelöv |
| 2017/0037641 A1 | 2/2017 | Nygren et al. |
| 2017/0081860 A1 | 3/2017 | Boo |
| 2017/0254096 A1 | 9/2017 | Pervan |
| 2017/0321433 A1 | 11/2017 | Pervan et al. |
| 2017/0340107 A1* | 11/2017 | Shen .................. A47B 47/042 |
| 2017/0362834 A1 | 12/2017 | Pervan et al. |
| 2018/0000151 A1 | 1/2018 | Fransson |
| 2018/0001509 A1 | 1/2018 | Myllykangas et al. |
| 2018/0001573 A1 | 1/2018 | Blomgren et al. |
| 2018/0002933 A1 | 1/2018 | Pervan |
| 2018/0030737 A1 | 2/2018 | Pervan |
| 2018/0030738 A1 | 2/2018 | Pervan |
| 2018/0119431 A1 | 5/2018 | Pervan et al. |
| 2018/0178406 A1 | 6/2018 | Fransson et al. |
| 2019/0024387 A1 | 1/2019 | Pervan et al. |
| 2019/0048592 A1 | 2/2019 | Boo |
| 2019/0048596 A1 | 2/2019 | Pervan |
| 2019/0063076 A1 | 2/2019 | Boo et al. |
| 2019/0093370 A1 | 3/2019 | Pervan et al. |
| 2019/0093371 A1 | 3/2019 | Pervan |
| 2019/0119928 A1 | 4/2019 | Pervan et al. |
| 2019/0127989 A1 | 5/2019 | Kell |
| 2019/0127990 A1 | 5/2019 | Pervan et al. |
| 2019/0169859 A1 | 6/2019 | Pervan et al. |
| 2019/0232473 A1 | 8/2019 | Fransson et al. |
| 2019/0271165 A1 | 9/2019 | Boo |
| 2019/0376298 A1 | 12/2019 | Pervan et al. |
| 2019/0394314 A1 | 12/2019 | Pervan et al. |
| 2020/0087927 A1 | 3/2020 | Pervan |
| 2020/0102756 A1 | 4/2020 | Pervan |
| 2020/0109569 A1 | 4/2020 | Pervan |
| 2020/0149289 A1 | 5/2020 | Pervan |
| 2020/0173175 A1 | 6/2020 | Pervan |
| 2020/0224430 A1 | 7/2020 | Ylikangas et al. |
| 2020/0263437 A1 | 8/2020 | Pervan |
| 2020/0284045 A1 | 9/2020 | Kell |
| 2020/0354969 A1 | 11/2020 | Pervan et al. |
| 2020/0412852 A9 | 12/2020 | Pervan et al. |
| 2021/0016465 A1 | 1/2021 | Fransson |
| 2021/0047840 A1 | 2/2021 | Pervan et al. |
| 2021/0047841 A1 | 2/2021 | Pervan et al. |
| 2021/0071428 A1 | 3/2021 | Pervan |
| 2021/0087831 A1 | 3/2021 | Nilsson et al. |
| 2021/0087832 A1 | 3/2021 | Boo |
| 2021/0087833 A1 | 3/2021 | Ylikangas et al. |
| 2021/0087834 A1 | 3/2021 | Ylikangas et al. |
| 2021/0190112 A1* | 6/2021 | Derelov ............... A47B 47/042 |
| 2021/0310257 A1 | 10/2021 | Boo |
| 2021/0348396 A1 | 11/2021 | Pervan et al. |
| 2021/0381255 A1 | 12/2021 | Ylikangas et al. |

FOREIGN PATENT DOCUMENTS

| | | | |
|---|---|---|---|
| BR | PI 0906645-4 A2 | 9/2009 | |
| DE | 25 05 489 A1 | 8/1976 | |
| DE | 3244398 A1 * | 6/1984 | ............ F16B 12/46 |
| DE | 202 05 774 U1 | 8/2002 | |
| DE | 10 2004 055 951 A1 | 7/2005 | |
| DE | 10 2004 062 648 | 7/2006 | |
| DE | 202019102277 U1 * | 6/2019 | ............ F16B 17/008 |
| EP | 1 420 125 A2 | 5/2004 | |
| EP | 1 650 375 A1 | 4/2006 | |
| EP | 1 650 375 A8 | 9/2006 | |
| EP | 2 689 904 A1 | 1/2014 | |
| EP | 2 774 735 A1 | 9/2014 | |
| EP | 3 354 909 A1 | 8/2018 | |
| EP | 3 478 901 A1 | 5/2019 | |
| EP | 2 774 735 B1 | 10/2019 | |
| FR | 2988274 A1 * | 9/2013 | ............ F16B 12/125 |
| GB | 240629 | 10/1925 | |
| GB | 376352 | 7/1932 | |
| GB | 1171337 | 11/1969 | |
| WO | WO 94/26999 A1 | 11/1994 | |
| WO | WO 96/27721 A1 | 9/1996 | |
| WO | WO 97/47834 A1 | 12/1997 | |
| WO | WO 00/20705 A1 | 4/2000 | |
| WO | WO 00/43281 A2 | 7/2000 | |

(56) References Cited

FOREIGN PATENT DOCUMENTS

| WO | WO 00/47841 A1 | 8/2000 | |
|---|---|---|---|
| WO | WO 00/55067 A1 | 9/2000 | |
| WO | WO 01/75247 A1 | 10/2001 | |
| WO | WO 03/083234 A1 | 10/2003 | |
| WO | WO 03/087497 A1 | 10/2003 | |
| WO | WO 2004/016877 A1 | 2/2004 | |
| WO | WO 2004/020764 A1 | 3/2004 | |
| WO | WO 2005/054599 A1 | 6/2005 | |
| WO | WO 2006/043893 A1 | 4/2006 | |
| WO | WO 2006/104436 A1 | 10/2006 | |
| WO | WO 2007/015669 A2 | 2/2007 | |
| WO | WO 2007/015669 A3 | 2/2007 | |
| WO | WO 2007/079845 A1 | 7/2007 | |
| WO | WO 2007/109787 A2 | 9/2007 | |
| WO | WO 2008/017301 A2 | 2/2008 | |
| WO | WO 2008/017301 A3 | 2/2008 | |
| WO | WO 2009/124517 A1 | 10/2009 | |
| WO | WO 2012/154113 A1 | 11/2012 | |
| WO | WO 2015/038059 A1 | 3/2015 | |
| WO | WO 2015/105451 A1 | 7/2015 | |
| WO | WO 2015/133768 A1 | 9/2015 | |
| WO | WO 2017/135874 A1 | 8/2017 | |
| WO | WO 2018/004438 A1 | 1/2018 | |
| WO | WO-2019169439 A1 * | 9/2019 | ........... A47B 96/024 |

OTHER PUBLICATIONS

Extended European Search Report dated Apr. 2, 2020 in EP 17820657.9, European Patent Office, Munich, DE, 4 pages.
International Search Report and Written Opinion issued in PCT/SE2017/050716, dated Sep. 15, 2017, 10 pages, ISA/SE, Patent-och registreringsverket, Stockholm, SE.
Extended European Search Report dated Jan. 2, 2020 in EP 17820655.3, European Patent Office, Munich, DE, 14 pages.
International Search Report and Written Opinion issued in PCT/SE2017/050717, dated Sep. 19, 2017, 13 pages, ISA/SE, Patent-och registreringsverket, Stockholm, SE.
Extended European Search Report dated Dec. 9, 2019 in EP 17820656.1, European Patent Office, Munich, DE, 10 pages.
International Search Report and Written Opinion issued in PCT/SE2017/050711, dated Sep. 19, 2017, 12 pages, SA/SE, Patent-och registreringsverket, Stockholm, SE.
Extended European Search Report dated Jan. 30, 2020 in EP 17820652.0, European Patent Office, Munich, DE, 10 pages.
International Search Report and Written Opinion issued in PCT/SE2017/051305, dated Mar. 5, 2018, 12 pages, ISA/SE, Patent-och registreringsverket, Stockholm, SE.
U.S. Appl. No. 17/060,325, Fransson.
Extended European Search Report dated Jul. 22, 2020 in EP 17883594.8, European Patent Office, Munich, DE, 5 pages.
International Search Report and Written Opinion issued in PCT/EP2020/059600, dated Jul. 7, 2020, 14 pages, ISA/SE, European Patent Office, Rijswijk, NL.
Fransson, Jonas, U.S. Appl. No. 17/060,325, entitled "Method and Device for Inserting a Tongue," filed Oct. 1, 2020.
Extended European Search Report dated Oct. 15, 2019 in EP 19167502.4, European Patent Office, Munich, DE, 6 pages.

* cited by examiner

FIG. 6A
FIG. 6B
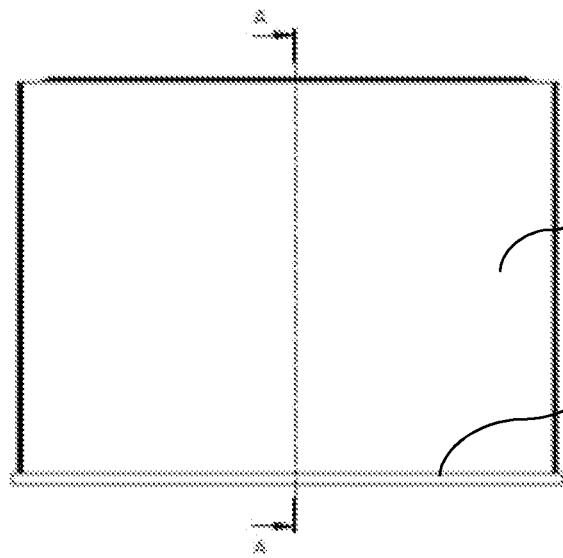
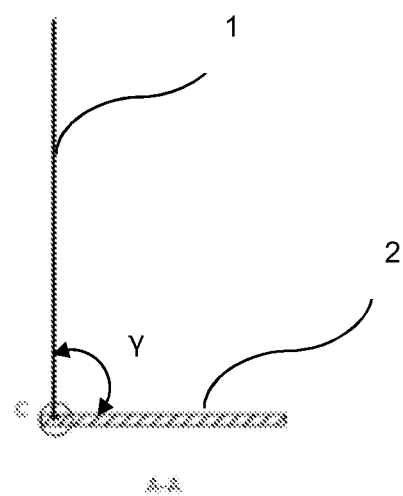
FIG. 7
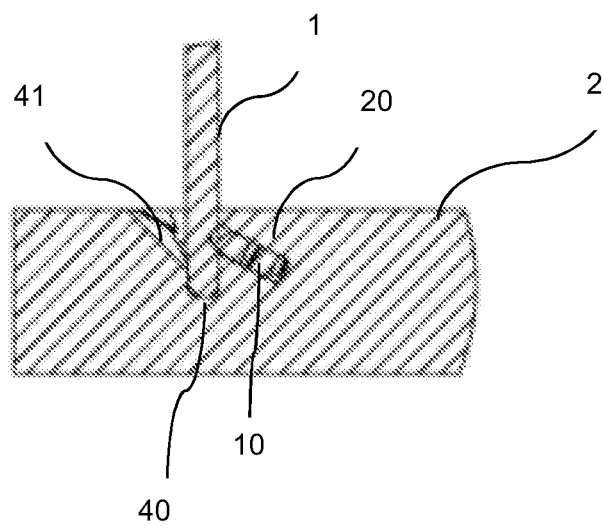

AUTOMATED ASSEMBLY

CROSS REFERENCE TO RELATED APPLICATIONS

The present application claims the benefit of European Application No. 19167502.4, filed on 5 Apr. 2019. The entire contents of European Application No. 19167502.4 are hereby incorporated herein by reference in their entirety.

TECHNICAL FIELD OF THE INVENTION

Embodiments of the present invention relate to a method of assembling a product, such as a furniture component or a furniture, such as a drawer, a cupboard, bookshelves, a wardrobe, a kitchen fixture, or a box for storing or transporting. The product comprises panels that may be arranged and connected perpendicular to each other and locked together with a mechanical locking device.

TECHNICAL BACKGROUND

A furniture product provided with a mechanical locking device is known in the art, as evidenced by WO2015/038059. The furniture product comprises a first panel connected perpendicular to a second panel by a mechanical locking device comprising a flexible tongue in an insertion groove.

A set of panels for an assembled product, together with a method of assembling a set of panels to obtain an assembled product, is known in the art, as evidenced by WO2015/105451.

The above description of various known aspects is the applicant's characterization of such, and is not an admission that any of the above description is considered as prior art.

Embodiments of the present invention address a need to provide a method of assembling panels, which method can be automated.

SUMMARY OF THE INVENTION

It is an object of certain aspects of the present invention to provide an improvement over the above described techniques and known art; particularly to improve the method for assembling a product, such as a furniture product.

A further object of at least certain aspects of the present invention is to facilitate assembling of panels configured to be assembled with a locking device that is easy to manufacture and to use, which reduces the risk of incorrect installation thereof.

At least some of these and other objects and advantages that will be apparent from the description have been achieved by a method of assembling a set of panels, to obtain an assembled product, such as a furniture component or a furniture, such as a drawer, a cupboard, bookshelves, a wardrobe, a kitchen fixture, or a box for storing or transporting, comprising connecting a first edge of a first panel, with a first main plane, to a first edge of a second panel, with a second main plane, the first main plane is arranged with a first angle in relation to the second main plane, the method comprising:
arranging a third panel with a third main plane perpendicular to the first main plane, arranging a first edge of the third panel at a second edge of the second panel and arranging the third main plane with a second angle in relation to the second main plane;
connecting the first edge of the third panel to the second edge of the second panel, by displacing the third panel and/or the second panel; and
connecting a second edge of the third panel to a second edge of the first panel and connecting the first edge of the third panel to the second edge of the second panel by pivoting the third panel in relation to the second main plane, so that the second angle between the third main plane and the second main plane is reduced to 90°.

According to an aspect the method comprises arranging a fourth panel, with a fourth main plane, perpendicular to the first main plane, arranging a first edge of the fourth panel at a third edge of the second panel and arranging the fourth main plane with a third angle in relation to the second main plane; and connecting the first edge of the fourth panel to the third edge of the second panel, by displacing the fourth panel and/or the second panel; and connecting a second edge of the fourth panel to a third edge of the first panel and connecting the first edge of the fourth panel to the third edge of the second panel by pivoting the fourth panel in relation to the third edge of the first panel, so that the third angle between the fourth main plane the second main plane is reduced to 90° and the fourth main plane is parallel to the third main plane.

According to an aspect the method comprises arranging a fifth panel, with a fifth main plane, perpendicular to the third and/or fourth main plane and with a fourth angle in relation to the first main plane; connecting a first edge of the fifth panel to a fourth edge of the first panel, by displacing the fifth panel and/or the first panel; and connecting a second edge of the first edge of the fifth panel to a third edge of the third panel and/or connecting a third edge of the fifth panel to a third edge of the fourth panel by pivoting the fifth panel in relation to the first main plane so that the fourth angle is reduced to 90° and the fifth main plane is parallel to the second main plane.

According to an aspect the method comprises connecting the first edge of a first panel to the first edge of the second panel by displacing the first panel relative the second panel and pivoting the second panel in relation to the first main plane so that the first angle is reduced to 90°.

According to an aspect the set of panels comprises at least five panels, wherein each connecting step comprises linearly displacing of one of said five panels.

According to an aspect each linear displacement is executed in a direction parallel to the first main plane.

According to an aspect least one connecting comprises displacing an outer part of a flexible tongue of a locking device into a tongue groove for locking an edge and an adjacent edge together.

According to an aspect at least one connecting comprises displacing an inner part of the flexible tongue in an insertion groove for locking the edge and the adjacent edge together.

According to an aspect at least one edge comprises an edge groove for locking an edge and an adjacent edge together.

According to an aspect said at least one edge groove comprises a recess, such as a bevel, at the outer edge for enabling said connecting by linear displacing and/or pivoting.

According to an aspect the first angle is more than 90°, or in the range of more than 90° to about 120°, or in the range of more than 90° to about 100°, before said pivoting of the second panel.

According to an aspect the second angle is more than 90°, or in the range of more than 90° to about 120°, or in the range of more than 90° to about 100°, before said pivoting of the third panel.

According to an aspect the third angle is more than 90°, or in the range of more than 90° to about 120°, or in the range of the range of more than 90° to about 100°, before said pivoting of the fourth panel.

According to an aspect the fourth angle (δ) is more than 90°, or in the range of more than 90° to about 120°, or in the range of the range of more than 90° to about 100°, before said pivoting of the fifth panel 5.

According to an aspect the method comprises a step of arranging one of the first panel or the second panel at a mounting surface and fixating a relative position between the first or second panel and the mounting surface.

According to an aspect the fixating comprises creating a vacuum between the first or second panel and the mounting surface.

According to an aspect the fixating comprises pressing the first or second panel towards the mounting surface by the vacuum.

According to an aspect the mounting surface comprises a seal for creating/defining a volume between the first or second panel and the mounting surface.

According to an aspect the method comprises a step of testing that the panels are assembled in an intended way, wherein the testing comprises pulling the fifth panel, essentially perpendicularly to the second panel, relative to the second panel in a direction away from the second panel, to test that all panels have been correctly assembled.

According to an aspect the second panel is fixated towards the mounting surface during the testing.

According to an aspect the step of connecting the first panel to the second panel comprises the step of lifting the first panel at the first edge.

According to an aspect the step of connecting the first edge of the fifth panel to the fourth edge of the first panel comprises the step of straightening out a curved part of the fourth edge of the first panel.

According to an aspect the step of straightening out comprises the step of gripping/holding the first panel at the fourth edge in a straight line.

According to an aspect the step of connecting the first edge of the fifth panel to the fourth edge of the first panel comprises the step of arranging the edge groove of the fifth panel off-set in relation to the fourth edge of the first panel, arranging the fifth panel at the fourth angle in relation to the first main plane, moving/displacing the edge groove of the fifth panel towards the fourth edge of the first panel to reduce the off-set and arranging the fourth edge in the edge groove by reducing the fourth angle of the fifth panel in relation to the first main plane and moving the fifth panel towards the first panel to connect the fifth panel to the first panel.

According to an aspect at least one step of arranging, connecting, fixating, gripping and/or pulling is automated, e.g. by the use of at least one robot.

According to an aspect all steps of arranging, connecting, fixating, gripping and/or pulling are automated, e.g. by the use of at least one robot.

According to an aspect the core of the first, second, third, fourth and/or fifth panel may be a wood-based core, preferably made of MDF, HDF, OSB, WPC, plywood or particleboard. The core may also be a plastic core comprising thermosetting plastic or thermoplastic e.g. vinyl, PVC, PU or PET. The plastic core may comprise fillers.

The first, second, third, fourth and/or fifth panel may also be of solid wood.

The first, second, third, fourth and/or fifth panel may be provided with a decorative layer, such as a foil or a veneer, on one or more surfaces.

At least some of the above identified and other objects and advantages that may be apparent from the description have been achieved by a method of assembling a set of panels in accordance with the above.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, in which FIG. 1 show a 3D view of an assembled set of panels according to an embodiment of the present invention.

FIGS. 5A-5B and 6A-6B show an embodiment of a method to assemble a set of panels of FIGS. 3A-3C, where the panels are in a locked position.

FIG. 7 shows an enlargement of part of the set of FIG. 6B, with a locking device according to an embodiment of the present invention in a locked position.

DETAILED DESCRIPTION

Figure 1:
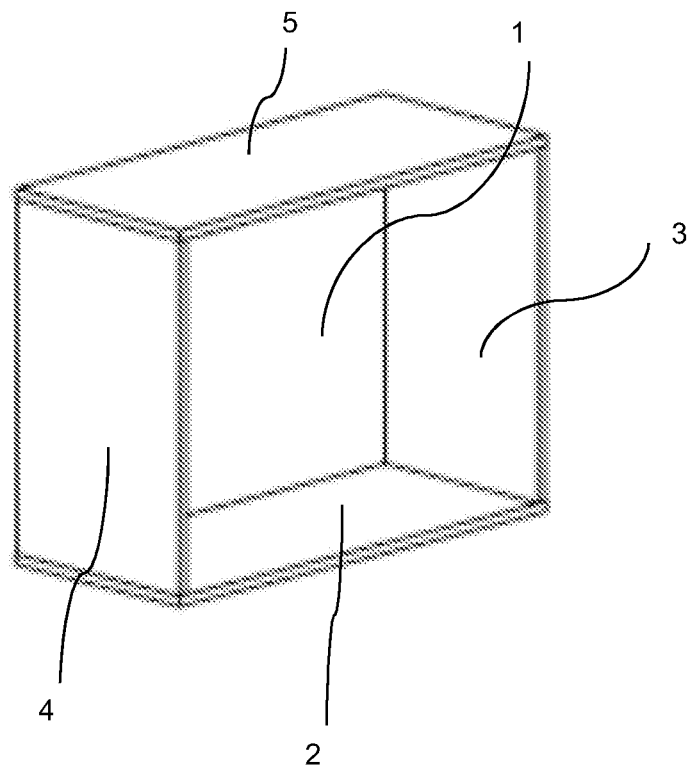
Figure 2:
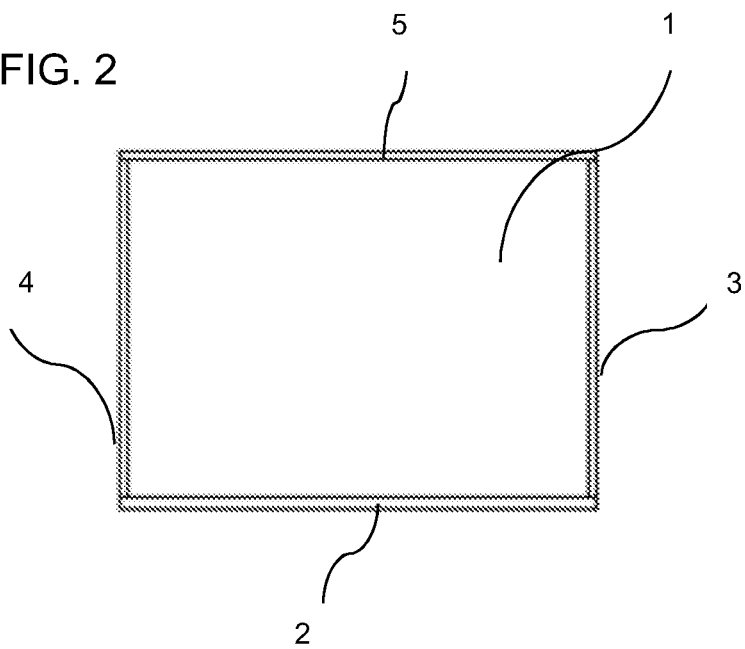
FIG. 2 shows a view of an embodiment of an assembled set of panels according to an embodiment of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

The different aspects, alternatives and embodiments of the invention disclosed herein can be combined with one or more of the other aspects, alternatives and embodiments described herein. Two or more aspects can be combined.

Embodiments of the invention are shown in FIGS. 1-21B, including a method of assembling a set of panels. The set of panels may be panels of a furniture that are connected perpendicular, or essentially perpendicular, to each other, i.e. with a main surface of a panel perpendicular to a main surface of an adjacent panel.

The method comprises connecting a first edge of a first panel 1, with a first main plane, to a first edge of a second panel 2, with a second main plane, where the first main plane is arranged with a first angle γ in relation to the second main plane. The method comprises arranging a third panel 3 with a third main plane perpendicular to the first main plane, arranging a first edge of the third panel 3 at a second edge of the second panel 2 and arranging the third main plane with a second angle α in relation to the second main plane; connecting the first edge of the third panel 3 to the second edge of the second 2 panel, by displacing the third panel 3 and/or the second panel 2; and connecting a second edge of the third panel 3 to a second edge of the first panel 1 and connecting the first edge of the third panel 3 to the second edge of the second panel 2 by pivoting the third panel 3 in relation to the second main plane, so that the second angle α between the third main plane and the second main plane is reduced to 90°.

The step of connecting the first panel 1 to the second panel 2 may comprise the step of lifting the first panel 1 at the first edge.

FIGS. 3A, 3B, 3C and 4 show how the first panel 1 and second panel 2 are being arranged and connected to each other, the first main plane having a first angle γ in relation to the second main plane, where the first angle γ is more than 90° or in the range of more than 90° to about 120°, or in the range of more than 90° to about 100°, before pivoting of the second panel 2 in relation to the first main plane.

Figure 3A:
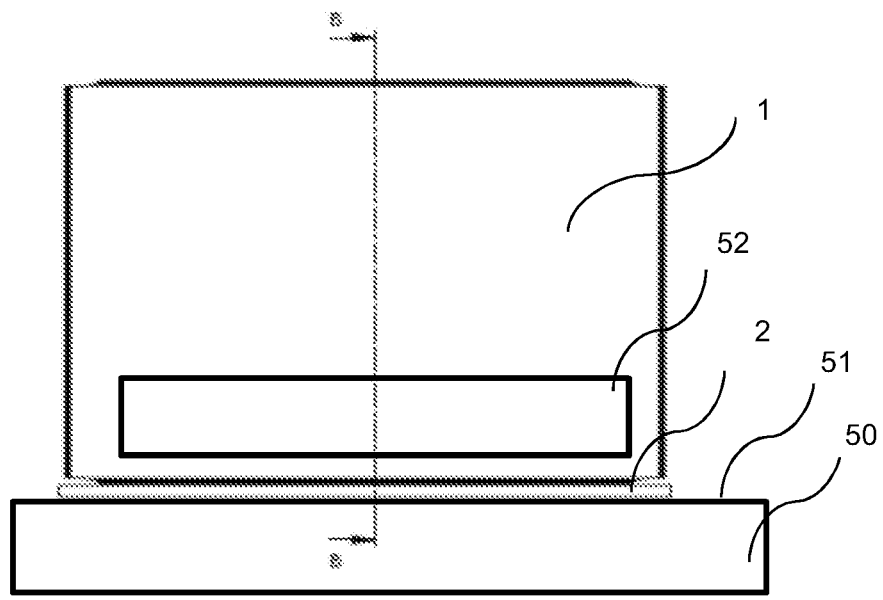
FIGS. 3A-3C show an embodiment of a method to assemble a set of panels according to an embodiment of the present invention.
Figure 3B:
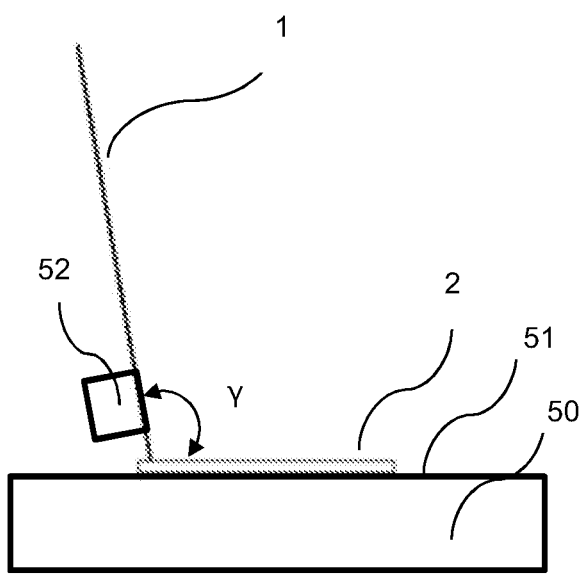
Figure 3C:
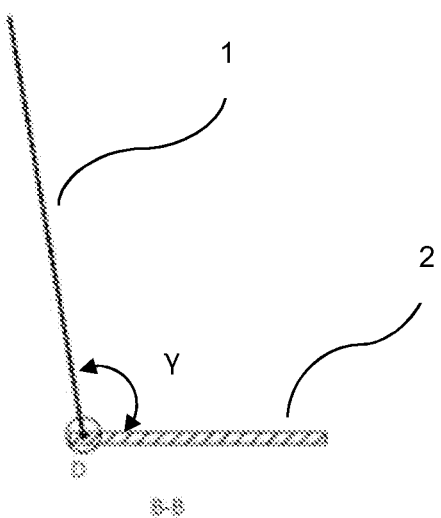
Figure 4:
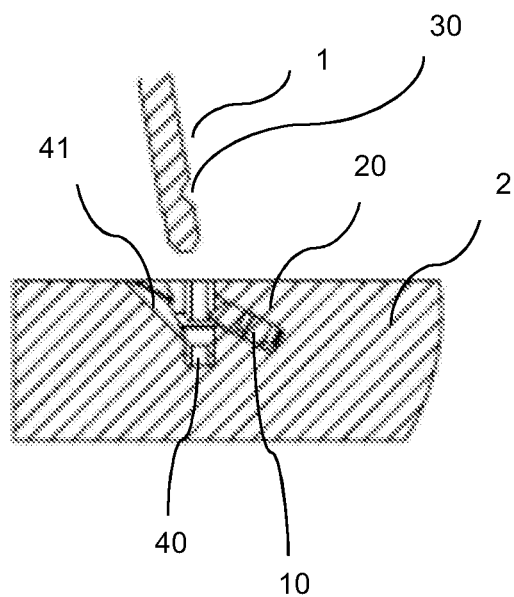
FIG. 4 shows an enlargement of part of the set of FIG. 3C, with a locking device of according to an embodiment the present invention in a non-locked position.
Figure 5A:
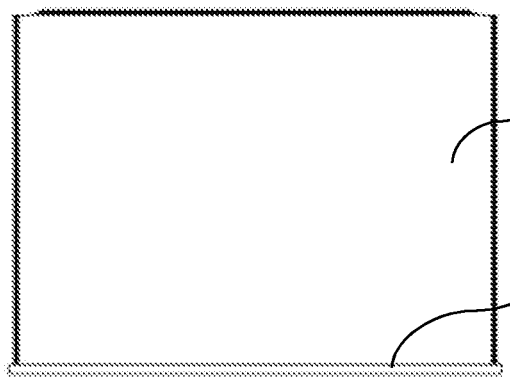
Figure 5B:
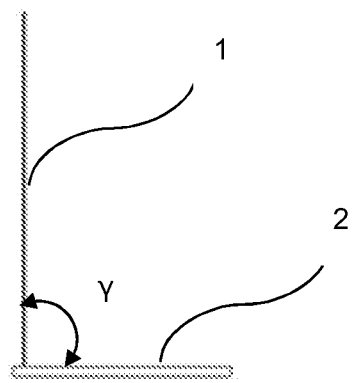

FIGS. 3A and 3B show an embodiment comprising gripping the first panel 1 at the first edge by a force preferably by a gripping device 52. The force may be obtained by creating a vacuum. The gripping device 52 may be displaced and controlled by a robot (not shown). The vacuum creating the force may be in the range of 40 to −90 kPa, preferably −60 to −70 kPa.

The force created by the vacuum may be in the range of 100 to 500 N, preferably 200 to 300 N.

The gripping device 52 or another gripping device may be used during the assembling of further panels of the set panels to obtain the assembled product. The gripping device 52 and the another gripping device may be functionally identical and/or essentially identical.

The force may be applied adjacent the first edge. This may increase the control of the edge and any curved part may be partly or completely straightened out. For example, the curved part may have an outermost surface that is from 0.4 to 100 mm, or 0.6 to 10 mm, out of line from the primary surface of the panel, and may be straightened out by 60% to 100% or 80% to 100% or 95% to 100% of the amount out of the line. The curved part may be straightened out such that the outermost surface goes from being more than 0.4 mm out of line to less than 0.4 mm out of line, or more than 1 mm out of line to less than 1 mm out of line. The force may be applied along the first edge or essentially along the entire first edge. A force may be applied by the gripping device 52 in a similar or the same way, at or along and/or adjacent the edge which is displaced and connected during the assembling of further panels of the set panels to obtain the assembled product.

FIGS. 5A, 5B, 6A, 6B and 7 show the first 1 and second 2 panel in an assembled state, when the first panel 1 and the second panel 2 have been arranged and connected to each other and the first angle γ has been reduced to 90° rafter pivoting of the second panel 2 in relation to the first main plane.

FIGS. 10A-10C and 11 show how the third panel 3 is being arranged with a third main plane perpendicular to the first main plane, the first edge of the third panel 3 at a second edge of the second panel 2, the third main plane having a second angle α in relation to the second main plane. The first edge of the third panel 3 is connected to the second edge of the second panel by displacing the third panel 3 and/or the second panel 2. The second angle α is more than 90°, or in the range of more than 90° to about 120°, or in the range of more than 90° to about 100°, before pivoting the third panel 3 in relation to the second main plane to reduce the second angle α to 90°.

Figure 8A:
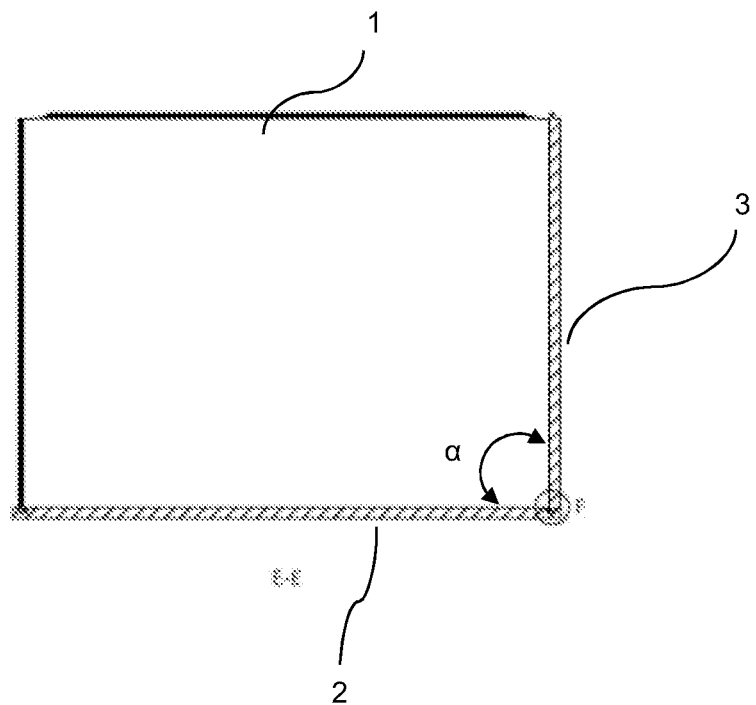
FIGS. 8A-8B show an embodiment of a method to assemble a set of panels according to an embodiment of the present invention.
Figure 8B:
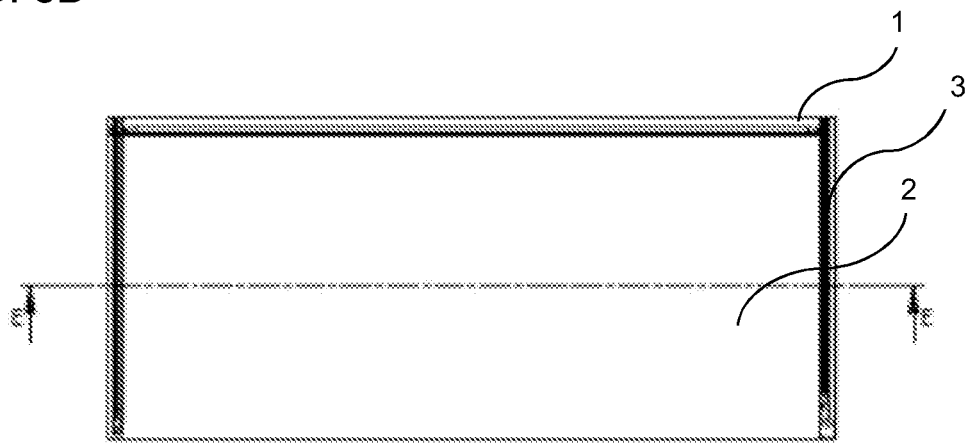
Figure 9:
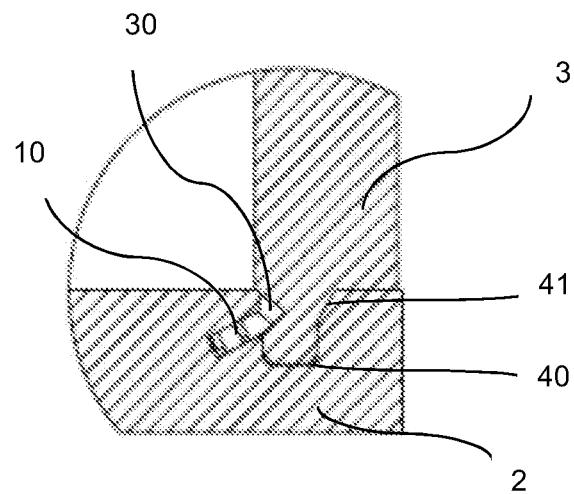
FIG. 9 shows an enlargement of part of the view shown in FIG. 8A.
Figure 10A:
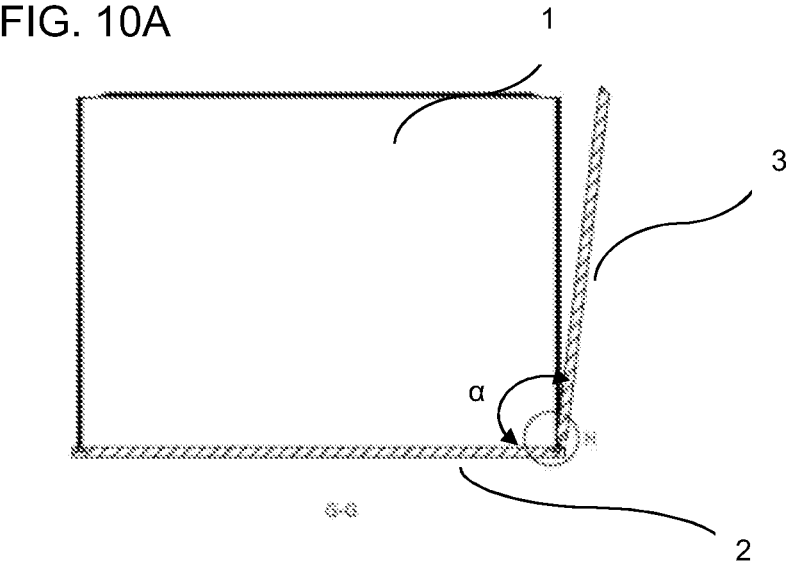
FIGS. 10A-10C show an embodiment of a method to assemble a set of panels according to an embodiment of the present invention.
Figure 10B:
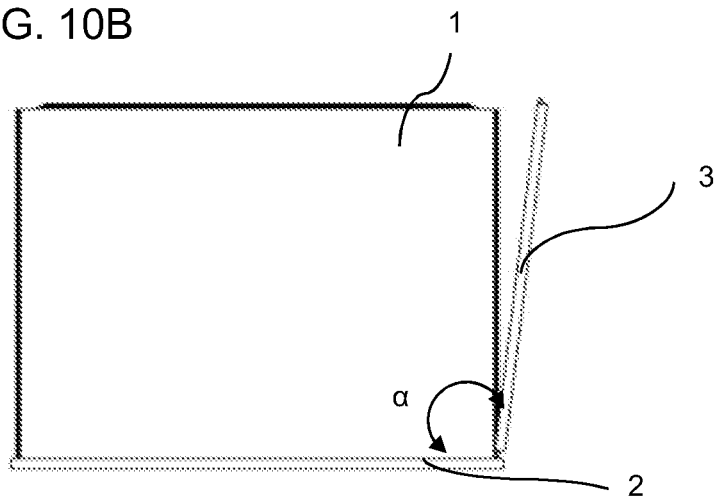
Figure 10C:
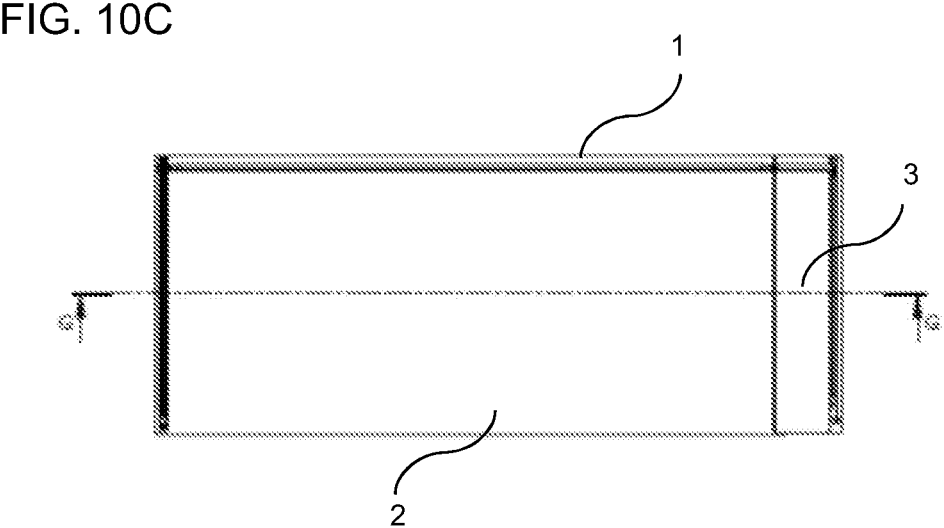
Figure 11:
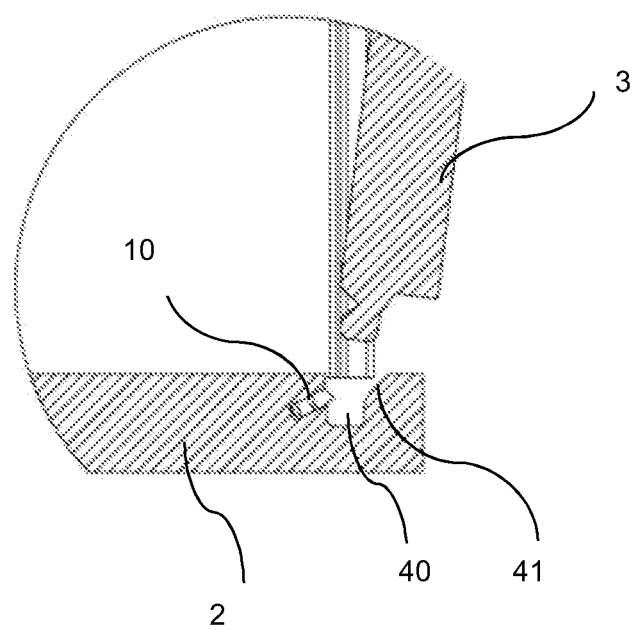
FIG. 11 shows an enlargement of part of the set shown in FIG. 10A.

FIGS. 8A-8B and 9 show the first 1, second 2 and third 3 panel in an assembled state, i.e. arranged and connected to each other and the second angle α reduced to 90°.

A fourth panel 4, with a fourth main plane, may be arranged perpendicular to the first main plane, a first edge of the fourth panel 4 arranged at a third edge of the second panel 2 and the fourth main plane arranged with a third angle β in relation to the second main plane. The first edge of the fourth panel 4 may then be connected to the third edge of the second 2 panel, by displacing the fourth panel 4 and/or the second panel 2; and a second edge of the fourth panel 4 connected to a third edge of the first panel 1 and the first edge of the fourth panel 4 connected to the third edge of the second 2 panel by pivoting the fourth panel 4 in relation to the third edge of the first panel 1, so that the third angle β between the fourth main plane the second main plane is reduced to 90° and the fourth main plane is parallel to the third main plane.

Figure 14A:
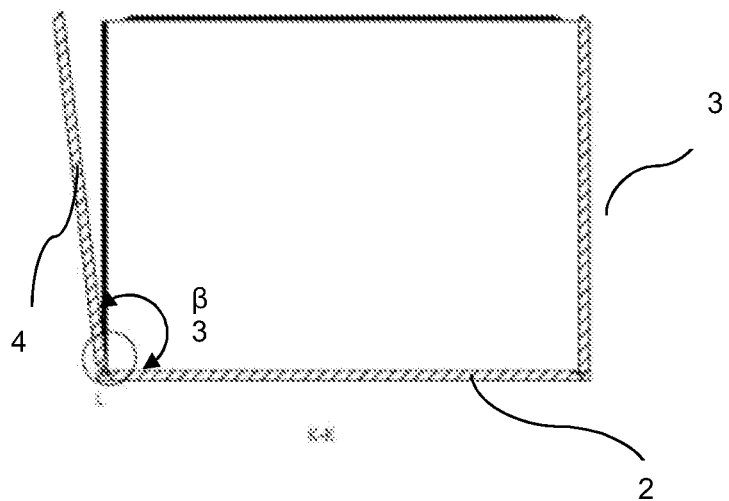
FIGS. 14A-14B show an embodiment of a method to assemble a set of panels according to an embodiment of the present invention.
Figure 14B:
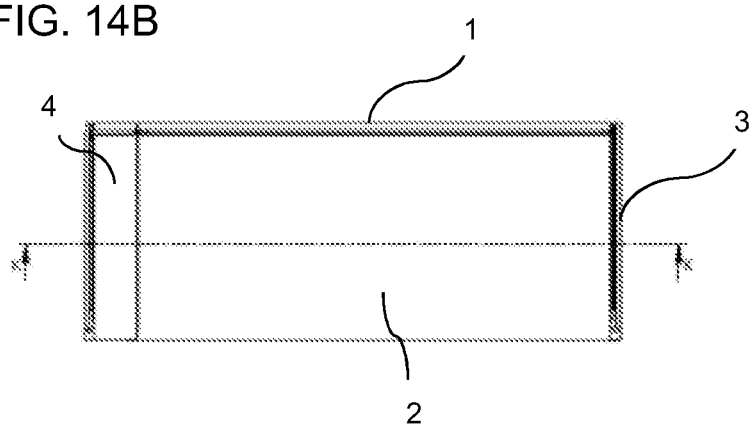
Figure 15:
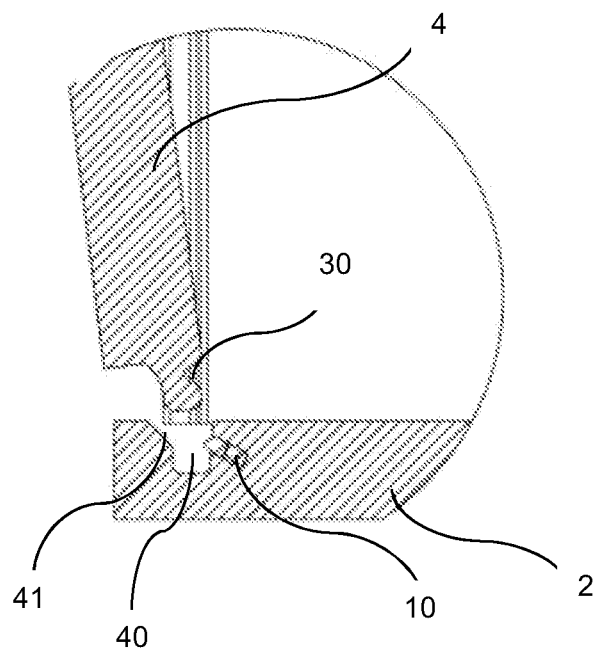
FIG. 15 shows an enlargement of part of the set shown in FIG. 14A.

FIGS. 14A-14B and FIG. 15 show how the fourth panel 4 is being arranged, with a third angle 3 between the fourth main plane and the second main plane, being connected to the second panel 2 by displacing the fourth 4 and/or the second 2 panel and connected to the first panel 1 and to the second panel 2 by pivoting the fourth panel 4 in relation to the third edge of the first panel 1, so that the third angle β between the fourth main plane and the second main plane is reduced to 90°. The third angle β is preferably more than 90°, or in the range of more than 90° to about 120°, or in the range of the range of more than 90° to about 100°, before pivoting of the fourth panel 4.

Figure 12A:
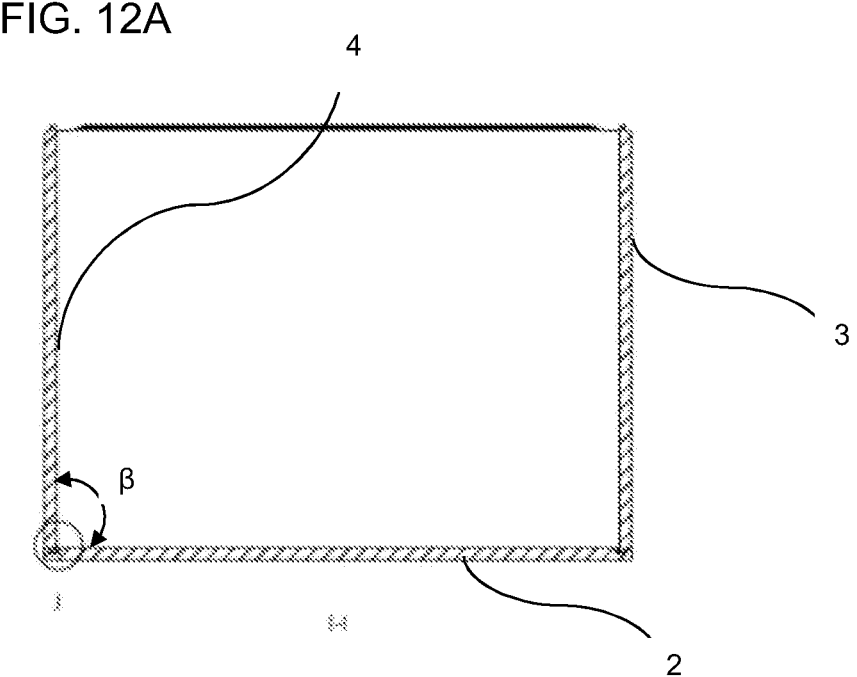
FIGS. 12A-12B show an embodiment of a method to assemble a set of panels according to an embodiment of the present invention.
Figure 12B:
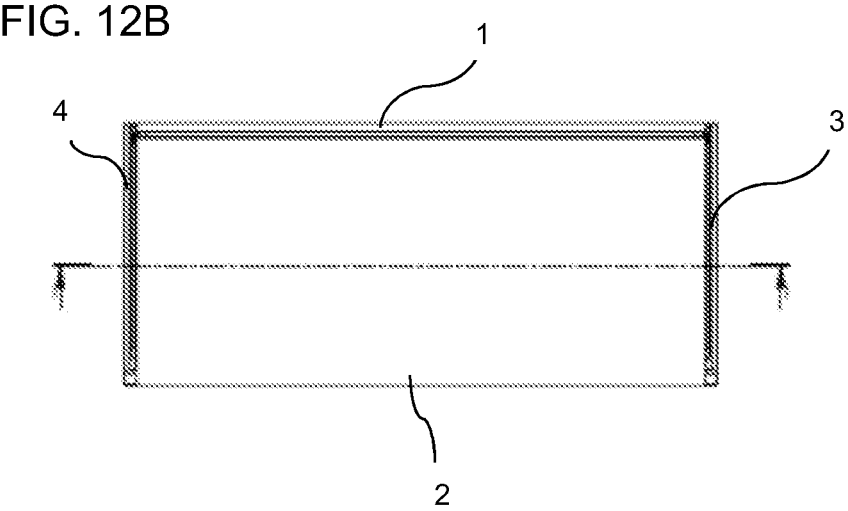
Figure 13:
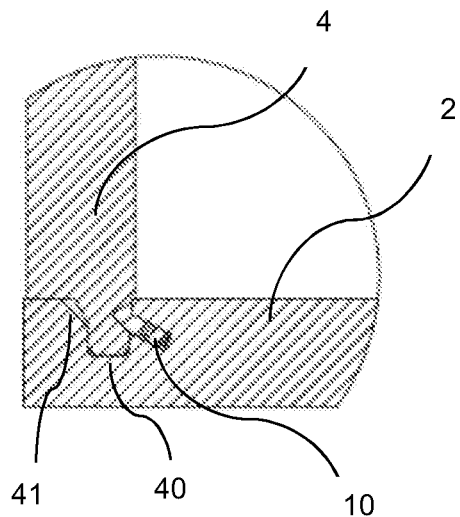
FIG. 13 shows an enlargement of part of the set shown in FIG. 12A.

FIGS. 12A-12B and FIG. 13 shows an assembled state, where the fourth panel 4 has been arranged and connected to the first 1 and second 2 panel, and the third angle β between the fourth main plane and the second main plane has been reduced to 90°.

The method for assembling of panels according to an embodiment of the present invention may further comprise arranging a fifth panel 5, with a fifth main plane, perpendicular to the third and/or fourth main plane and with a fourth angle δ in relation to the first main plane; connecting a first edge of the fifth panel 5 to a fourth edge of the first panel 1, by displacing the fifth panel 5 and/or the first panel 1; and connecting a second edge of the fifth panel 5 to a third edge of the third panel 3 and/or connecting a third edge of the fifth panel 5 to a third edge of the fourth panel 4 by pivoting the fifth panel 5 in relation to the first main plane so that the fourth angle δ is reduced to 90° and the fifth main plane is parallel to the second main plane.

FIGS. 16A-16C and FIG. 17 show how the fifth panel 5 is being arranged with a fifth main plane, and with a fourth angle δ in relation to the first main plane, connected to the first panel 1 by displacing the fifth panel 5 and/or the first panel 1, connected to the third panel 3 and/or the fourth panel 4 by pivoting the fifth panel 5 in relation to the first main plane, and the fourth angle δ reduced to 90° so that the fifth main plane becomes parallel to the second main plane. The fourth angle δ is preferably more than 90°, or in the range of more than 90° to about 120°, or in the range of the range of more than 90° to about 100°, before pivoting of the fifth panel 5.

Figure 16A:
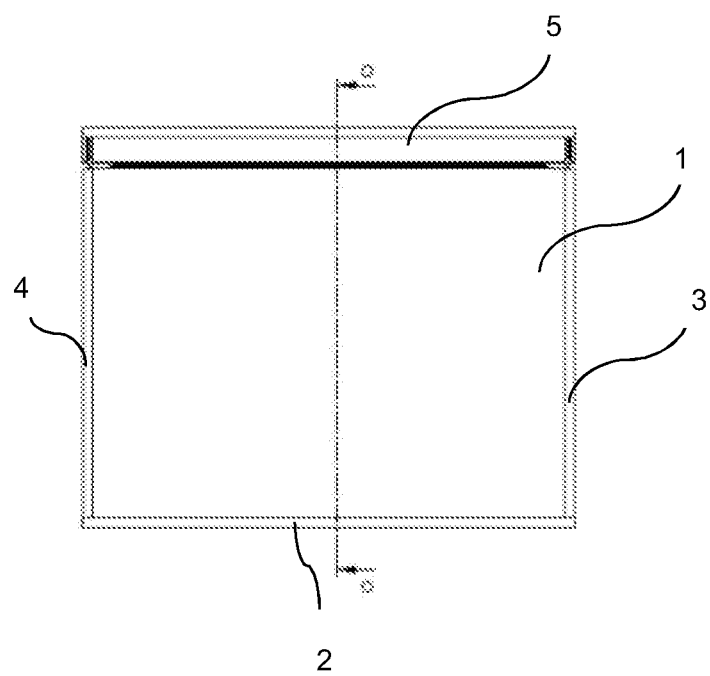
FIGS. 16A-16C show an embodiment of a method to assemble a set of panels according to an embodiment of the present invention.
Figure 16B:
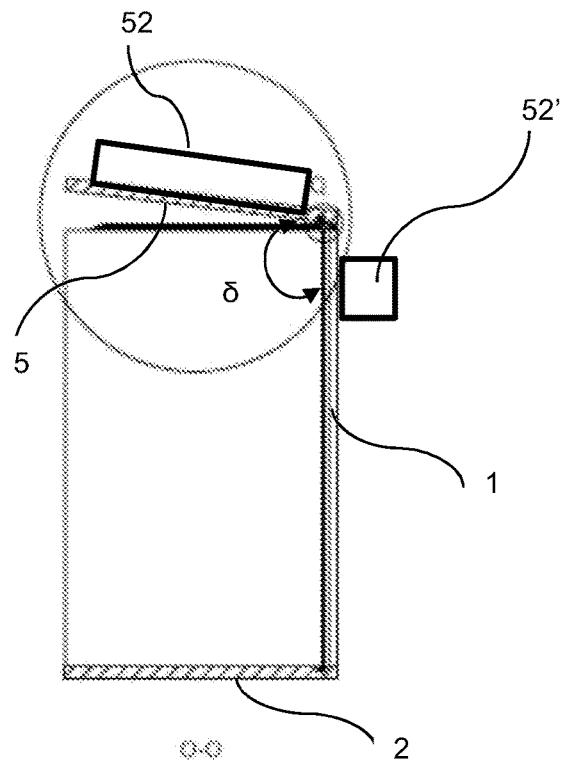
Figure 16C:
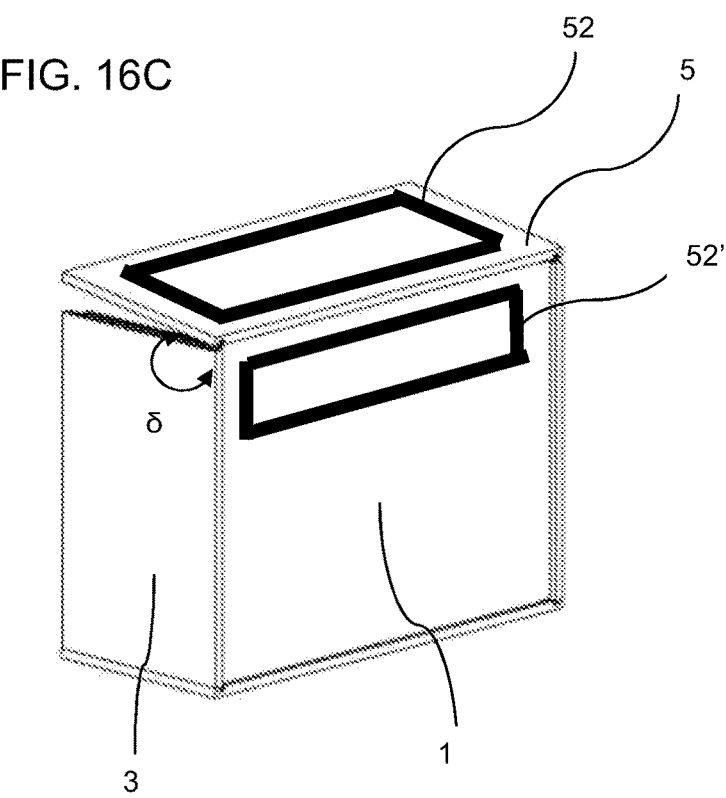

FIG. 16A shows a front view of the set of panels during assembling of the fifth panel 5, FIG. 16B show a cross cut at the line O-O indicated in FIG. 16A and FIG. 16C shows the set of panels during assembling of the fifth panel 5 in a 3D-view.

FIGS. 16B and 16C show an embodiment comprising gripping the fifth panel 5 by a gripping device 52. The gripping device may grip the fifth panel at or adjacent and/or along the first edge, at the second edge and at the third edge. The gripping device 52 may create a vacuum to grip the fifth panel 5. The gripping device 52 may be displaced and controlled by a robot (not shown).

The embodiment may comprise gripping the first 1 panel at the fourth edge by a force preferably by another gripping device 52'. The force may be applied adjacent the fourth edge. This may increase the control of the edge and any curved part of the edge may be straighten out. The force may be applied along the fourth edge or essentially along the entire fourth edge.

When connecting the first edge of the fifth panel 5 to the fourth edge of the first panel 1, the fourth edge of the first panel 1 may have a curved shape, which makes the connecting step more difficult. The method of the present invention may therefore, in one aspect, comprise a step of straightening out the curved part of the fourth edge of the first panel 1. The step of straightening out may comprise gripping/holding the first panel 1 at the fourth edge in a straight line as shown in FIG. 16C.

Figure 17:
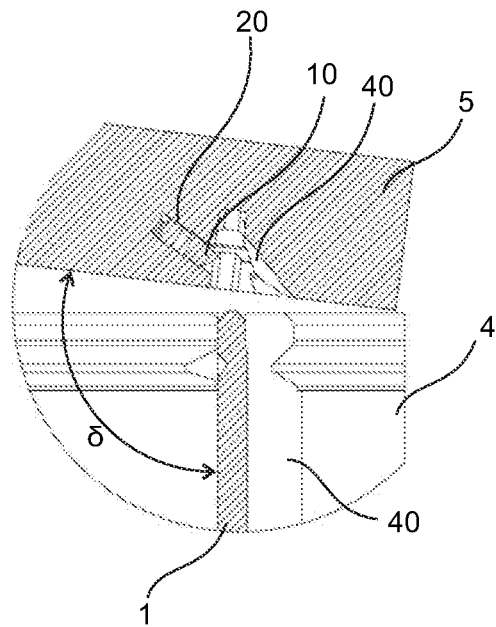
FIG. 17 shows an enlargement of part of the set shown in FIG. 16B.

FIG. 17 shows an enlargement of part of the set shown in FIG. 16B. The fifth main plane of the fifth panel 5 is arranged at a fourth angle δ in relation to the first main plane of the first panel 1. The first panel 1 is arranged in an edge groove 40 of the fourth panel 4. The edge groove 40 of the fifth panel 5 is positioned at the fourth edge of the first panel 1. The edge groove 40 of the fifth panel may comprise a flexible tongue 10 arranged in an insertion groove 20.

Figure 18A:
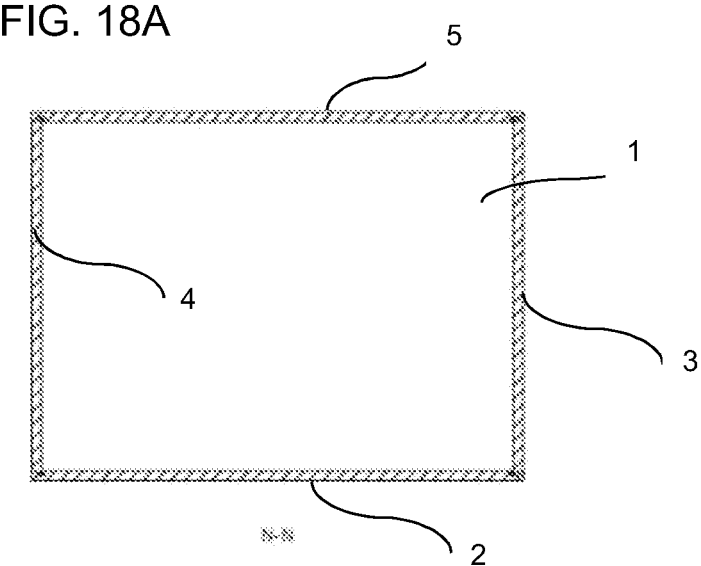
FIGS. 18A-18B show an embodiment of a method to assemble a set of panels according to an embodiment of the present invention.
Figure 18B:
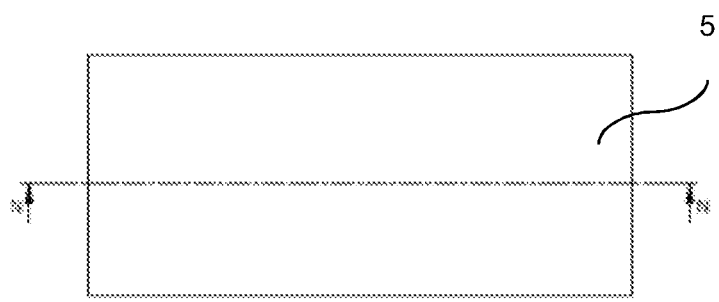

FIGS. 18A and 18B shows an assembled state, where the fifth panel 5 has been arranged and connected to the first 1, third 3 and fourth 4 panel, and the fourth angle δ has been reduced to 90°. FIG. 18B shows a top view of the assembled set of panels and FIG. 18A shows a crosscut at the line indicated by N-N in FIG. 18B.

The first edge of the first panel 1 may be connected to the first edge of the second panel 2 by displacing the first panel 1 relative the second panel 2 and pivoting the second panel in relation to the first main plane so that the first angle (γ) is reduced to 90°.

Each step of connecting the panels may comprise linearly displacing of one of the panels. Each step of linearly displacing may be executed in a direction parallel to the first main plane.

The panels to be assembled in accordance with the embodiments as described above may comprise a locking device comprising a flexible tongue 10 arranged in an insertion groove 20 on an edge of a panel. An outer part of the flexible tongue 10 may be displaced into a tongue groove 30 of another panel, for locking the edge of one panel and the adjacent edge of another panel together, and an inner part of the flexible tongue 10 may be displaced in the insertion groove 20 when locking the edges of the panels together.

FIGS. 4, 7, 9, 11, 13, 15, 17, and 19A-20B show panels with edges comprising a flexible tongue 10 in an insertion groove 20, where the flexible tongue 10 may cooperate with the tongue groove 30 of another panel for locking of the panel and the adjacent panel together.

The panels according to an embodiment of the present invention may comprise and edge groove 40 for locking of an edge of one panel together with an adjacent edge of another panel. The edge groove 40 may further comprise a recess 41, such as a bevel, at the outer edge. The recess 41 enables easy connecting the edge of one panel together with an edge of an adjacent panel by linear displacing and/or pivoting.

FIGS. 4, 11, 15, 19A-19C and 20A show the edge groove 40 and recess 41 when the panels are in a non-locked position while FIGS. 7, 9, 13 and 20B show the edge groove 40 and recess 41 when the panels are in a locked position.

Figure 19A:
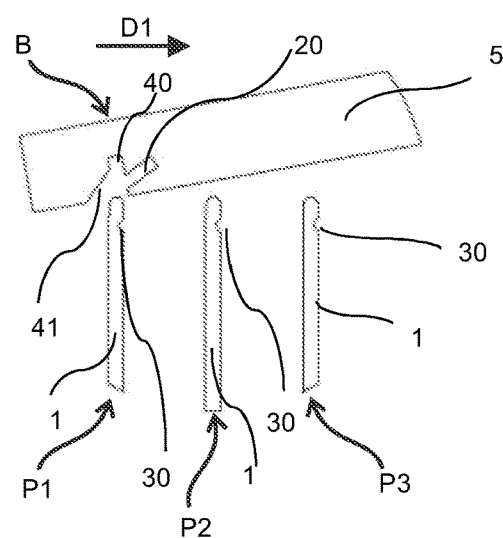
FIGS. 19A-19C show an embodiment of a method to assemble a set of panels according to an embodiment of the present invention.
Figure 19B:
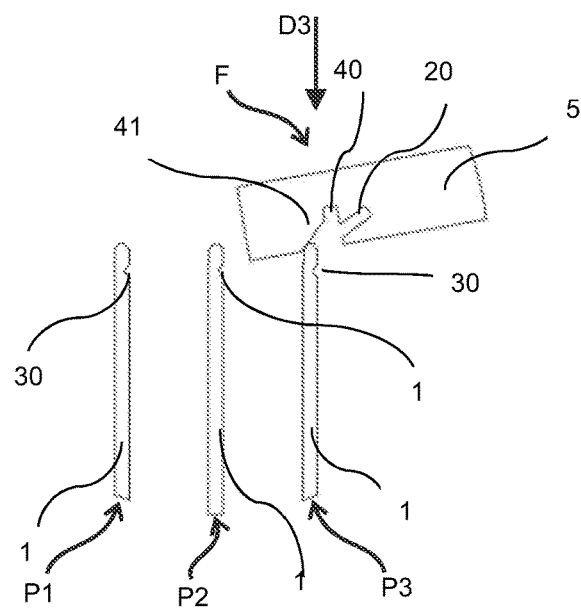
Figure 19C:
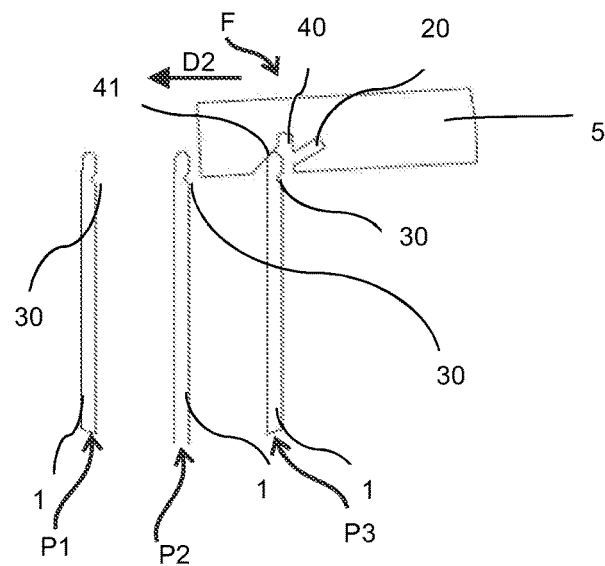

FIGS. 19A-19C relate to the step of connecting the fifth panel 5. The step of connecting the first edge of the fifth panel 5 to the fourth edge of the first panel 1 may comprise arranging the edge groove 40 of the fifth panel 5 in a position that is off-set in relation to a correct position the fourth edge of the first panel 1.

The FIGS. 19A-19C illustrate three different positions of the fourth edge of the first panel 1. The left position P1 is a back position, the middle position is the correct position P2 and the right position is a front position P3 of the fourth edge of the first panel 1. A part of the fourth edge of the first panel 1 may be positioned at the back position P1 or at the front position P3 due to a bent shape of the fourth edge of the first panel 1.

The step comprises arranging the fifth panel 5 at the fourth angle δ in relation to the first panel 1. The step further comprises positioning of the fifth panel 5 at a back-position B with the edge groove 40 positioned at the back position P1 of the fourth edge of the first panel 1 as shown in FIG. 19A. A part of the of the fourth edge of the first panel 1 may be positioned in the edge groove 40. The fifth panel 5 is displaced in a first direction D1 to a front position F with the edge groove 40 positioned at the front position P3 of the fourth edge of the first panel 1 as shown in FIG. 19B. The fifth panel 5 is displaced in a third direction D3 such that a greater part of the fourth edge of the first panel 1 is positioned in the edge groove 40. The fifth panel 5 is thereafter moved back in a second direction D2 to a position in which the edge groove 40 is at the correct position P2 of the fourth edge of the first panel 1.

This step may comprise:
- positioning of the fifth panel 5 at a back-position B with the edge groove 40 positioned at a back position P1 of the fourth edge of the first panel 1 preferably with part of the of the fourth edge of the first panel 1 positioned in the edge groove 40
- displacing the fifth panel 5 in a first direction D1 to a front position F with the edge groove 40 positioned at a front position P3 of the fourth edge of the first panel 1
- displacing the fifth panel 5 in a third direction D3 such that a greater part of the fourth edge of the first panel 1 is positioned in the edge groove 40, and
- displacing the fifth panel 5 in a second direction D2, which is opposite to the first direction, to a position in which the edge groove 40 is at a correct position P2 of the fourth edge of the first panel 1.

Figure 20A:
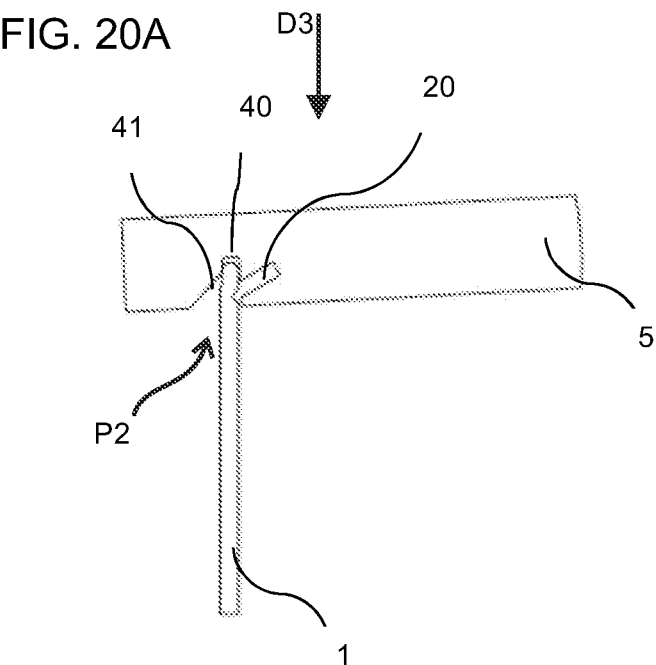
FIGS. 20A-20B show an embodiment of a method to assemble a set of panels according to an embodiment of the present invention.
Figure 20B:
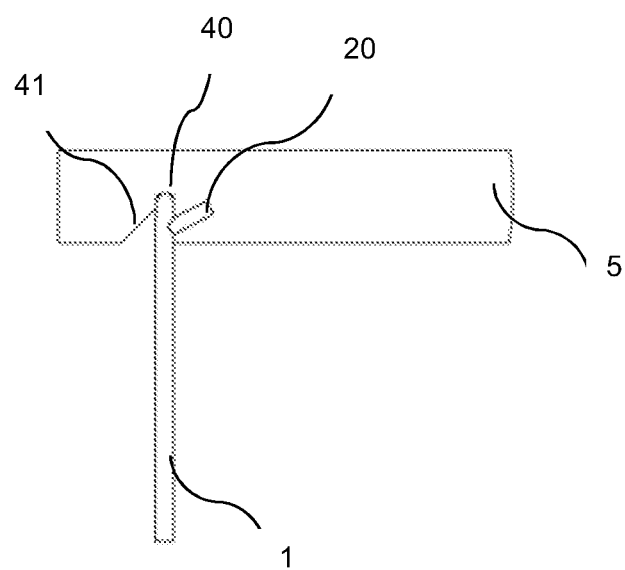

Furthermore, the fourth edge may be arranged in the edge groove 40 by reducing the fourth angle δ of the fifth panel 5 in relation to the first main plane and the fifth panel 5 is moved towards the first panel 1 in the third direction D3 to connect the fifth panel 5 to the first panel 1, as illustrated in detail in FIGS. 20A-20B.

When assembling the panels according to an embodiment of the present invention, the method may comprise a step where one of the first panel 1 or the second panel 2 is arranged at a mounting surface 51, and the relative position between the first 1 or second 2 panel and the mounting surface 51 is fixated, making the assembly easier. The step of fixating may comprise creating a vacuum by a fixture 50 between the first 1 or second 2 panel and the mounting surface 51, where the first 1 or second 2 panel may be pressed towards the mounting surface by the vacuum. The mounting surface 51 may comprise a seal for creating/defining a volume between the first 1 or second 2 panel and the mounting surface 51.

The gripping and/or pulling of one or more of the first, the second, the third, the fourth or the fifth panel includes creating a vacuum, preferably by a gripping device 52.

Figure 21A:
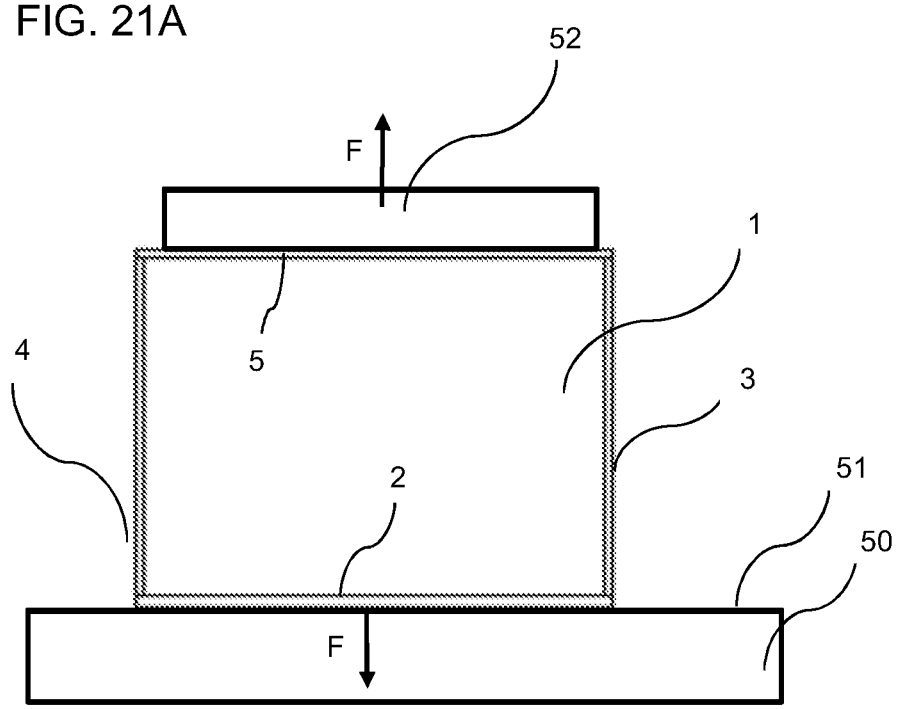
FIG. 21A shows an embodiment of a method to test an assembled product according to an embodiment of the present invention.

An embodiment of a method to test that the panels according to an embodiment of the present invention have been assembled in the way they are intended to be assembled is shown in FIG. 21A. The assembled product may be positioned on a mounting surface 51 which may be a surface of a fixture 50. The fifth panel 5 may be pulled by force F', essentially perpendicularly to the second panel 2, relative the second panel 2 in a direction away from the second panel 2. If all panels remain assembled after such testing, this indicates that the panels have been correctly assembled. If all panels, however, do not remain assembled after such testing, this indicates that the panels have not been assembled in the intended way. During the testing, the second panel 2 may be fixated by a force F''' towards the mounting surface 51. The forces F', F''' may be in the range of 100 to 500 N, preferably 200 to 300 N.

Figure 21B:
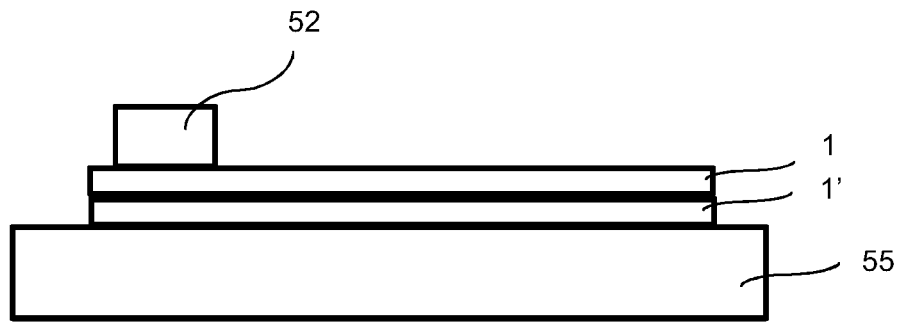
FIG. 21B shows an embodiment of a method to pile and grip a panel of according to an embodiment the present invention.

One or more of the first, the second, the third, the fourth or the fifth panel may be stored in a pile before assembling. FIG. 21B shows an embodiment comprising piling of two of said first panel 1, 1'. The panels may be positioned on a piling fixture 55. The method may comprise gripping an upper and/or outer panel of said first panel 1 in the pile by a gripping device 52 at the first edge of the first panel 1, displacing the first panel towards the second panel and connect the first edge of the first panel 1 to the first edge of a second panel 2.

At least one step of arranging, connecting, fixating, gripping and/or pulling, or alternatively, all steps of arranging, connecting, fixating, gripping and/or pulling, according to according to an embodiment the present invention may be automated, e.g. by the use of at least one robot.

The first 1, second 2, third 3, fourth 4 and/or fifth 5 panel are preferably panels for a furniture product. The first panel 1 may be a back piece of a bookshelf or a wardrobe and the second 2, third 3, fourth 4 and fifth 5 panel may be a board of the frame, and may be a part of a frame of a furniture product.

The core of the first 1, second 2, third 3, fourth 4 and/or fifth 5 panel may be a wood-based core, preferably made of MDF, HDF, OSB, WPC, plywood or particleboard. The core may also be a plastic core comprising thermosetting plastic or thermoplastic, e.g., vinyl, PVC, PU or PET. The plastic core may comprise fillers.

The first 1, second 2, third 3, fourth 4 and/or fifth 5 panel may also be of solid wood.

The first 1, second 2, third 3, fourth 4 and/or fifth 5 panel may be provided with a decorative layer, such as a foil or a veneer, on one or more surfaces.

According to an aspect the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The panels described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil is preferably printed, for example by direct printing, rotogravure, or digital printing. According to an aspect the decorative layer may comprise melamine, a high pressure laminate (HPL) or a veneer.

The panels described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The panels described above may comprise a wood base core, such as HDF, MDF, plywood, particleboard, OSB or Masonite.

Further numbered embodiments of the invention are listed below.

1. A method of assembling a set of panels, preferably by a robot, to obtain an assembled product, such as a furniture component or a furniture, such as a drawer, a cupboard, bookshelves, a wardrobe, a kitchen fixture, or a box for storing or transporting, comprising connecting a first edge of a first panel 1, with a first main plane, to a first edge of a second panel 2, with a second main plane, the first main plane is arranged with a first angle γ in relation to the second main plane, the method comprising:

arranging a third panel 3 with a third main plane perpendicular to the first main plane, arranging a first edge of the third panel 3 at a second edge of the second panel 2 and arranging the third main plane with a second angle α in relation to the second main plane;

connecting the first edge of the third panel 3 to the second edge of the second panel 2, by displacing the third panel 3 and/or the second panel 2; and connecting a second edge of the third panel 3 to a second edge of the first panel 1 and connecting the first edge of the third panel 3 to the second edge of the second 2 panel by pivoting the third panel 3 in relation to the second main plane, so that the second angle α between the third main plane and the second main plane is reduced to 90°.

2. The method as described in embodiment 1, comprising arranging a fourth panel 4, with a fourth main plane, perpendicular to the first main plane, arranging a first edge of the fourth panel 4 at a third edge of the second panel 2 and arranging the fourth main plane with a third angle β in relation to the second main plane; and connecting the first edge of the fourth panel 4 to the third edge of the second 2 panel, by displacing the fourth panel 4 and/or the second panel 2; and connecting a second edge of the fourth panel 4 to a third edge of the first panel 1 and connecting the first edge of the fourth panel 4 to the third edge of the second 2 panel by pivoting the fourth panel 4 in relation to the third edge of the first panel 1, so that the third angle β between the fourth main plane and the second main plane is reduced to 90° and the fourth main plane is parallel to the third main plane.

3. The method as described in embodiment 1 or 2, comprising arranging a fifth panel 5, with a fifth main plane, perpendicular to the third and/or fourth main plane and with a fourth angle δ in relation to the first main plane;

connecting a first edge of the fifth panel 5 to a fourth edge of the first panel 1, by displacing the fifth panel 5 and/or the first panel 1; and connecting a second edge of the fifth panel 5 to a third edge of the third panel 3 and/or connecting a third edge of the fifth panel 5 to a third edge of the fourth panel 4 by pivoting the fifth panel 5 in relation to the first main plane so that the fourth angle δ is reduced to 90° and the fifth main plane is parallel to the second main plane.

4. The method as described in any one of the previous embodiments, comprising connecting the first edge of the first panel 1 to the first edge of the second panel 2 by displacing the first panel 1 relative the second panel 2 and pivoting the second panel 2 in relation to the first main plane so that the first angle γ is reduced to 90°.

5. The method as described in any one of the previous embodiments, wherein the set of panels comprises at least five panels, wherein each connecting step comprises linearly displacing of one of said five panels.

6. The method as described in any one of the previous embodiments, wherein each linear displacement is executed in a direction parallel to the first main plane.

7. The method as described in any one of the previous embodiments, wherein at least one connecting comprises displacing an outer part of a flexible tongue 10 of a locking device into a tongue groove 30 for locking an edge and an adjacent edge together.

8. The method as described embodiment 7, wherein at least one connecting comprises displacing an inner part of the flexible tongue 10 in an insertion groove 20 for locking the edge and the adjacent edge together.

9. The method as described in any one of the previous embodiments, wherein at least one edge comprises an edge groove 40 for locking an edge and an adjacent edge together.

10. The method as described in embodiment 9, wherein said at least one edge groove 40 comprises a recess 41, such as a bevel, at the outer edge for enabling said connecting by linear displacing and/or pivoting.

11. The method as described in any one of embodiments 4-10, wherein the first angle γ is more than 90°, or in the range of more than 90° to about 120°, or in the range of more than 90° to about 100°, before said pivoting of the second panel 2.

12. The method as described in any one of the previous embodiments, wherein the second angle α is more than 90°, or in the range of more than 90° to about 120°, or in the range of more than 90° to about 100°, before said pivoting of the third panel 3.

13. The method as described in any one of embodiments 2-12, wherein the third angle β is more than 90°, or in the range of more than 90° to about 120°, or in the range of the range of more than 90° to about 100°, before said pivoting of the fourth panel 4.

14. The method as described in any one of embodiments 3-13, wherein the fourth angle δ is more than 90°, or in the range of more than 90° to about 120°, or in the range of more than 90° to about 100°, before said pivoting of the fifth panel 5.

15. The method as described in any one of the previous embodiments, comprising a step of arranging one of the first panel 1 or the second panel 2 at a mounting surface 51 and fixating a relative position between the first 1 or second 2 panel and the mounting surface 51.

16. The method as described in embodiment 15, wherein the fixating comprises creating a vacuum between the first 1 or second 2 panel and the mounting surface 51.

17. The method as described in embodiment 15 or 16, wherein the fixating comprises pressing the first 1 or second 2 panel towards the mounting surface 51 by the vacuum.

18. The method as described in any one of embodiments 15 to 17, wherein the mounting surface 51 comprises a seal for creating/defining a volume between the first 1 or second 2 panel and the mounting surface 51.

19. The method as described in any one of embodiments 3 to 18, comprising a step of testing that the panels are assembled in an intended way, wherein the testing comprises pulling the fifth panel 5, essentially perpendicularly to the second panel, 2 relative to the second panel 2 in a direction away from the second panel 2, to test that all panels have been correctly assembled.

20. The method as described in embodiment 19, wherein the second panel 2 is fixated towards the mounting surface 51 during the testing.

21. The method as described in any one of the previous embodiments, wherein the step of connecting the first panel 1 to the second panel 2 comprises the step of lifting the first panel 1 at the first edge.

22. The method as described in any one of embodiments 3 to 21, wherein the step of connecting the first edge of the fifth panel 5 to the fourth edge of the first panel 1 comprises the step of straightening out a curved part of the fourth edge of the first panel 1.

23. The method as described in embodiment 22, wherein the step of straightening out comprises the step of gripping/holding the first panel 1 at the fourth edge in a straight line.

24. The method as described in any one of embodiments 3 to 23, wherein the step of connecting the first edge of the fifth panel 5 to the fourth edge of the first panel 1 comprises the step of arranging the edge groove 40 of the fifth panel 5 off-set in relation to the fourth edge of the first panel 1, arranging the fifth panel 5 at the fourth angle δ in relation to the first main plane, moving/displacing the edge groove 40 of the fifth panel 5 towards the fourth edge of the first panel 1 to reduce the off-set and arranging the fourth edge in the edge groove 40 by reducing the fourth angle δ of the fifth panel 5 in relation to the first main plane and moving the fifth panel 5 towards the first panel 1 to connect the fifth panel 5 to the first panel 1.

25. The method as described in any one of embodiments 3 to 23, wherein the step of connecting the first edge of the fifth panel 5 to the fourth edge of the first panel 1 comprises positioning of the fifth panel 5 at a back-position B with the edge groove 40 positioned at a back position P1 of the fourth edge of the first panel 1 preferably with part of the of the fourth edge of the first panel 1 positioned in the edge groove 40 displacing the fifth panel 5 in a first direction D1 to a front position F with the edge groove 40 positioned at a front position P3 of the fourth edge of the first panel 1 displacing the fifth panel 5 in a third direction D3 such that a greater part of the fourth edge of the first panel 1 is positioned in the edge groove 40, and displacing the fifth panel 5 in a second direction D2, which is opposite to the first direction, to a position in which the edge groove 40 is at a correct position P2 of the fourth edge of the first panel 1.

26. The method as described in embodiments 25, wherein the method comprises displacing the fifth panel 5 in a third direction D3 such that a greater part of the fourth edge of the first panel 1 is positioned in the 27. The method as described in any one of the previous embodiments, wherein at least one step of arranging, connecting, fixating, gripping and/or pulling is automated, e.g. by the use of at least one robot.

28. The method as described in any one of the previous embodiments, where all steps of arranging, connecting, fixating, gripping and/or pulling are automated, e.g. by the use of at least one robot which may comprise a gripping device 52.

29. The method as described in any one of the previous embodiments, wherein the gripping and/or pulling of one or more of the first, the second, the third, the fourth or the fifth panel includes creating a vacuum, preferably by a gripping device 52.

The different aspects, embodiments and alternatives described above could be combined with one or more of the other described aspects, embodiments and alternatives.

The invention claimed is:

1. A method of assembling a set of panels to obtain an assembled product, comprising:

connecting a first edge of a first panel, with a first main plane, to a first edge of a second panel, with a second main plane, the first main plane is arranged with a first angle in relation to the second main plane;

arranging a third panel with a third main plane perpendicular to the first main plane, arranging a first edge of the third panel at a second edge of the second panel and arranging the third main plane with a second angle in relation to the second main plane;

connecting the first edge of the third panel to the second edge of the second panel, by displacing the third panel and/or the second panel; and connecting both (i) a second edge of the third panel to a second edge of the first panel and (ii) the first edge of the third panel to the second edge of the second panel, by pivoting the third panel in relation to the second main plane, so that the second angle between the third main plane and the second main plane is reduced to 90°.

2. The method as claimed in claim 1, comprising arranging a fourth panel, with a fourth main plane, perpendicular to the first main plane, arranging a first edge of the fourth panel at a third edge of the second panel and arranging the fourth main plane with a third angle in relation to the second main plane; and connecting the first edge of the fourth panel to the third edge of the second panel, by displacing the fourth panel and/or the second panel; and connecting both (i) a second edge of the fourth panel to a third edge of the first panel and (ii) the first edge of the fourth panel to the third edge of the second panel, by pivoting the fourth panel in relation to the third edge of the first panel, so that the third angle between the fourth main plane and the second main plane is reduced to 90° and the fourth main plane is parallel to the third main plane.

3. The method as claimed in claim 2, comprising arranging a fifth panel, with a fifth main plane, perpendicular to the third and/or fourth main plane and with a fourth angle in relation to the first main plane;

connecting a first edge of the fifth panel to a fourth edge of the first panel, by displacing the fifth panel and/or the first panel; and connecting (i) a second edge of the fifth panel to a third edge of the third panel and/or (ii) a third edge of the fifth panel to a third edge of the fourth panel, by pivoting the fifth panel in relation to the first main plane so that the fourth angle is reduced to 90° and the fifth main plane is parallel to the second main plane.

4. The method as claimed in claim 3, wherein the fourth angle is more than 90°, before said pivoting of the fifth panel.

5. The method as described in claim 3, wherein the step of connecting the first edge of the fifth panel to the fourth edge of the first panel comprises:
  positioning of the fifth panel at a back position with an edge groove of the fifth panel positioned at a back position of the fourth edge of the first panel,
  displacing the fifth panel in a first direction to a front position with the edge groove of the fifth panel positioned at a front position of the fourth edge of the first panel,
  displacing the fifth panel in a third direction and thereby increase an extent to which the fourth edge of the first panel is positioned in the edge groove of the fifth panel, and
  displacing the fifth panel in a second direction D2, which is opposite to the first direction, to a position in which the edge groove of the fifth panel is at a fully assembled position of the fourth edge of the first panel.

6. The method as described in claim 5, wherein the method comprises displacing the fifth panel in a third direction and thereby increase the extent to which the fourth edge of the first panel is positioned in the edge groove of the fifth panel.

7. The method as claimed in claim 3, wherein the step of connecting the first edge of the fifth panel to the fourth edge of the first panel comprises the step of arranging an edge groove of the fifth panel off-set in relation to the fourth edge of the fifth panel, arranging the fifth panel at the fourth angle in relation to the first main plane, moving/displacing the edge groove of the fifth panel towards the fourth edge of the first panel to reduce the off-set and arranging the fourth edge in the edge groove of the fifth panel by reducing the fourth angle of the fifth panel in relation to the first main plane and moving the fifth panel towards the first panel to connect the fifth panel to the first panel.

8. The method as claimed in claim 2, wherein the third angle is more than 90°, before said pivoting of the fourth panel.

9. The method as claimed in claim 1, comprising
  connecting the first edge of the first panel to the first edge of the second panel by displacing the first panel relative the second panel and pivoting the second panel in relation to the first main plane so that the first angle is reduced to 90°.

10. The method as claimed in claim 9, wherein the first angle is more than 90°, before said pivoting of the second panel.

11. The method as claimed in claim 1, wherein the set of panels comprises at least five panels, wherein each connecting step comprises linearly displacing of one of said five panels.

12. The method as claimed in claim 11, wherein each linear displacement is executed in a direction parallel to the first main plane.

13. The method as claimed in claim 1, wherein at least one of the connecting comprises displacing an outer part of a flexible tongue of a locking device into a tongue groove for locking an edge and an adjacent edge together.

14. The method as claimed claim 13, wherein at least one of the connecting comprises displacing an inner part of the flexible tongue in an insertion groove for locking the edge and the adjacent edge together.

15. The method as claimed in claim 1, wherein at least one edge comprises an edge groove for locking an edge and an adjacent edge together.

16. The method as claimed in claim 15, wherein said at least one edge groove comprises a recess at an outer edge of the at least one edge groove for enabling said connecting by linear displacing and/or pivoting.

17. The method as claimed in claim 1, wherein the second angle is more than 90°, before said pivoting of the third panel.

* * * * *